United States Patent
Kim et al.

(10) Patent No.: US 10,311,324 B1
(45) Date of Patent: Jun. 4, 2019

(54) LEARNING METHOD, LEARNING DEVICE FOR DETECTING OBJECTNESS BY DETECTING BOTTOM LINES AND TOP LINES OF NEAREST OBSTACLES AND TESTING METHOD, TESTING DEVICE USING THE SAME

(71) Applicant: Stradvision, Inc., Pohang (KR)

(72) Inventors: Kye-Hyeon Kim, Seoul (KR); Yongjoong Kim, Pohang-si (KR); Insu Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Donghun Yeo, Pohang-si (KR); Wooju Ryu, Pohang-si (KR); Taewoong Jang, Seoul (KR); Kyungjoong Jeong, Pohang-si (KR); Hongmo Je, Pohang-si (KR); Hojin Cho, Pohang-si (KR)

(73) Assignee: STRADVISION, INC., Pohang (KR)

( * ) Notice: Subject to any disclaimer, the term of this patent is extended or adjusted under 35 U.S.C. 154(b) by 0 days.

(21) Appl. No.: 16/171,706

(22) Filed: Oct. 26, 2018

(51) Int. Cl.
*G06K 9/00* (2006.01)
*G06K 9/46* (2006.01)
(Continued)

(52) U.S. Cl.
CPC ....... *G06K 9/4604* (2013.01); *G06K 9/00805* (2013.01); *G06K 9/66* (2013.01); *G06N 3/084* (2013.01); *G06N 5/046* (2013.01)

(58) Field of Classification Search
CPC .......... G06K 9/00805; G06K 9/00818; G06K 9/00825; G06K 9/00791; G06K 9/00979;
(Continued)

(56) References Cited

U.S. PATENT DOCUMENTS

| | | | |
|---|---|---|---|
| 2015/0347831 A1* | 12/2015 | Tamatsu | H04N 5/144 382/156 |
| 2017/0287137 A1* | 10/2017 | Lin | G06K 9/66 |
| 2018/0068198 A1* | 3/2018 | Savvides | G06K 9/3233 |

OTHER PUBLICATIONS

Ren, Qinghua, and Renjie Hu. "Multi-scale deep encoder-decoder network for salient object detection." Neurocomputing 316 (2018): 95-104. (Year: 2018).*

(Continued)

*Primary Examiner* — Geoffrey E Summers
(74) *Attorney, Agent, or Firm* — Xsensus LLP

(57) ABSTRACT

A method for learning parameters of CNNs capable of identifying objectnesses by detecting bottom lines and top lines of nearest obstacles in an input image is provided. The method includes steps of: a learning device, (a) instructing a first CNN to generate first encoded feature maps and first decoded feature maps, and instructing a second CNN to generate second encoded feature maps and second decoded feature maps; (b) generating first and second obstacle segmentation results respectively representing where the bottom lines and the top lines are estimated as being located per each column, by referring to the first and the second decoded feature maps respectively; (c) estimating the objectnesses by referring to the first and the second obstacle segmentation results; (d) generating losses by referring to the objectnesses and their corresponding GTs; and (f) backpropagating the losses, to thereby learn the parameters of the CNNs.

28 Claims, 14 Drawing Sheets
(4 of 14 Drawing Sheet(s) Filed in Color)

(51) Int. Cl.
  *G06K 9/66* (2006.01)
  *G06N 3/08* (2006.01)
  *G06N 5/04* (2006.01)
(58) Field of Classification Search
  CPC ........ G06K 9/4604; G06K 9/66; G06N 3/084;
         G06N 5/046; G06T 7/10; G06T 7/194;
                    G06T 2207/20084
  USPC ................ 382/103, 104, 156, 157, 158, 173
  See application file for complete search history.

(56) References Cited

OTHER PUBLICATIONS

Jain, Suyog Dutt, Bo Xiong, and Kristen Grauman. "Pixel objectness." arXiv preprint arXiv:1701.05349 (2017). (Year: 2017).*

Joseph, K. J., and Vineeth N. Balasubramanian. "MASON: A Model AgnoStic ObjectNess Framework." arXiv preprint arXiv: 1809.07499 (2018). (Year: 2018).*

Kuo, Weicheng, Bharath Hariharan, and Jitendra Malik. "DeepBox: Learning Objectness with Convolutional Networks." Computer Vision (ICCV), 2015 IEEE International Conference on. IEEE, 2015. (Year: 2015).*

Ren, Shaoqing, et al. "Faster r-cnn: Towards real-time object detection with region proposal networks." Advances in neural information processing systems. 2015. (Year: 2015).*

Badrinarayanan, Vijay, Alex Kendall, and Roberto Cipolla. "SegNet: A Deep Convolutional Encoder-Decoder Architecture for Image Segmentation." IEEE Transactions on Pattern Analysis and Machine Intelligence 39.12 (2017): 2481-2495. (Year: 2017).*

Fu, Jun, et al. "Densely connected deconvolutional network for semantic segmentation." Image Processing (ICIP), 2017 IEEE International Conference on. IEEE, 2017. (Year: 2017).*

Garcia-Garcia, Alberto, et al. "A survey on deep learning techniques for image and video semantic segmentation." Applied Soft Computing 70 (2018): 41-65. (Year: 2018).*

Noh, Hyeonwoo, Seunghoon Hong, and Bohyung Han. "Learning Deconvolution Network for Semantic Segmentation." Computer Vision (ICCV), 2015 IEEE International Conference on. IEEE, 2015. (Year: 2015).*

* cited by examiner

FIG. 5
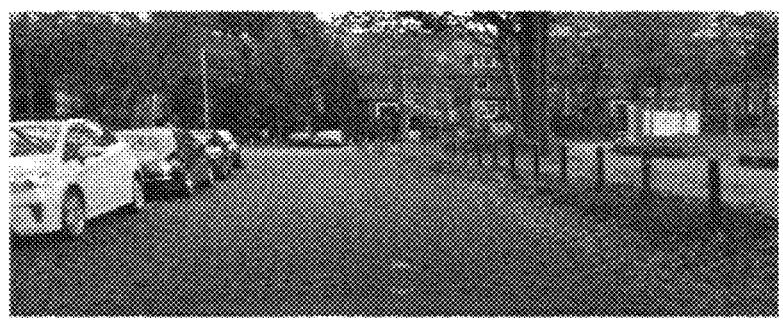
INPUT IMAGE
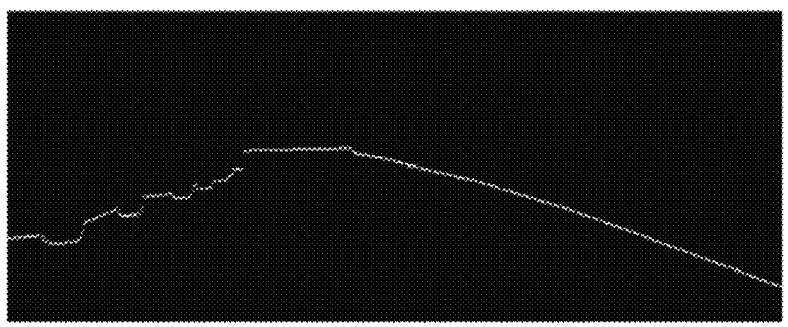
GROUNG TRUTH (GT)

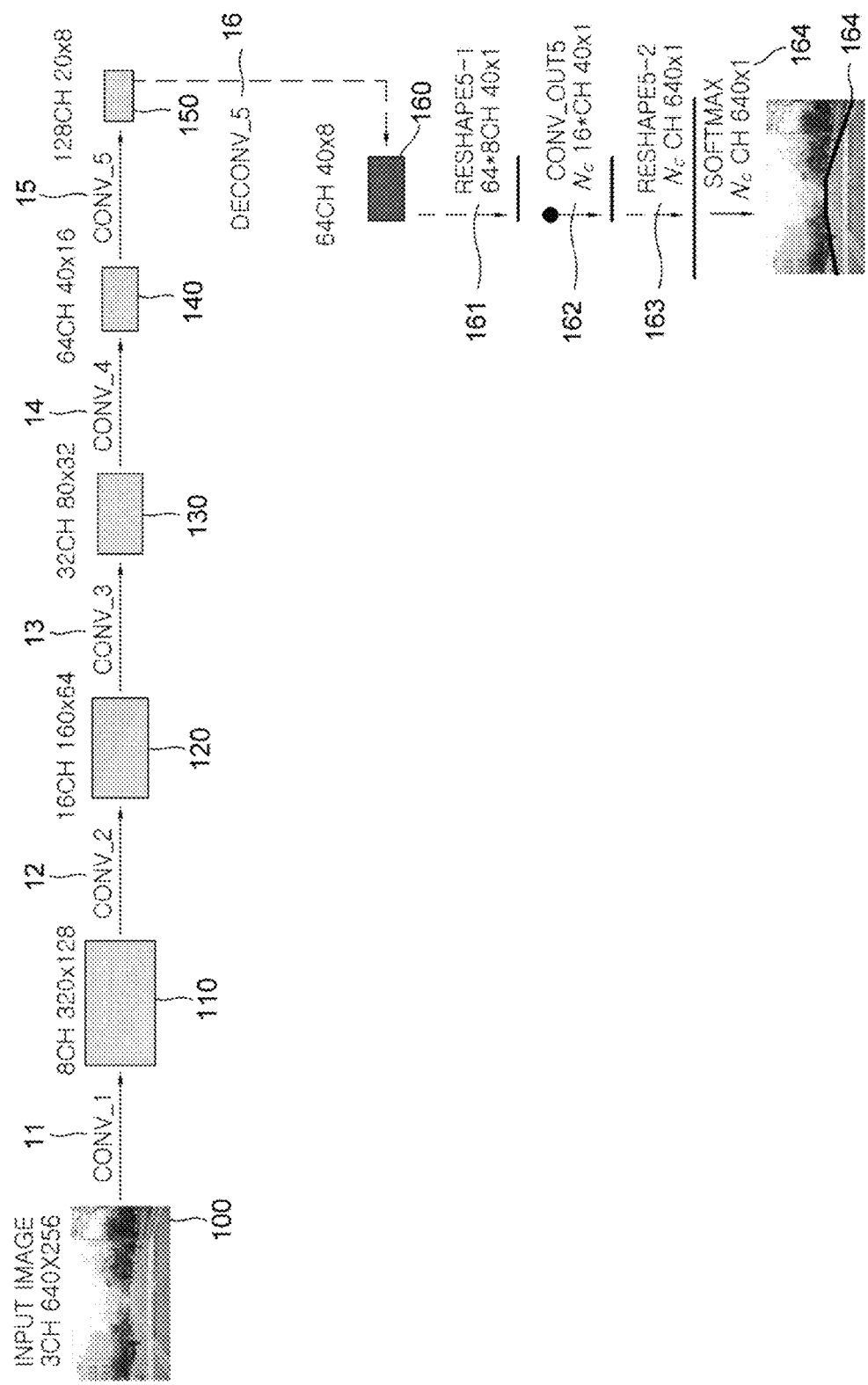

LEARNING METHOD, LEARNING DEVICE FOR DETECTING OBJECTNESS BY DETECTING BOTTOM LINES AND TOP LINES OF NEAREST OBSTACLES AND TESTING METHOD, TESTING DEVICE USING THE SAME

FIELD OF THE INVENTION

The present invention relates to a method for learning parameters of CNNs capable of identifying one or more objectnesses by detecting one or more bottom lines and one or more top lines of one or more nearest obstacles in at least one input image; and more particularly, to the method for learning the parameters of the CNNs capable of identifying the objectnesses by detecting the bottom lines and the top lines of the nearest obstacles in the input image including steps of: (a) if the input image is acquired as a training image, (i) instructing one or more convolutional layers of a first CNN to sequentially generate one or more first encoded feature maps from the input image, and instructing one or more deconvolutional layers of the first CNN to sequentially generate one or more first decoded feature maps from the first encoded feature maps, and (ii) instructing one or more convolutional layers of a second CNN to sequentially generate one or more second encoded feature maps from the input image, and instructing one or more deconvolutional layers of the second CNN to sequentially generate one or more second decoded feature maps from the second encoded feature maps; (b) on condition that each cell of a grid with a plurality of rows and a plurality of columns is generated by dividing the first and the second decoded feature maps, with respect to a first direction and a second direction, wherein the first direction is in a direction of the rows of the first and the second decoded feature maps and the second direction a direction of the columns thereof, (i) generating at least one first obstacle segmentation result representing each of first specific rows, where each of the bottom lines of each of the nearest obstacles is estimated as being located per each of the columns, by referring to at least one feature of at least one specific first decoded feature map among the first decoded feature maps, and (ii) generating at least one second obstacle segmentation result representing each of second specific rows, where each of the top lines of each of the nearest obstacles is estimated as being located per each of the columns, by referring to at least one feature of at least one specific second decoded feature map among the second decoded feature maps; (c) estimating the objectnesses corresponding to the nearest obstacles on a road by referring to the first obstacle segmentation result and the second obstacle segmentation result; (d) generating one or more losses by referring to the objectnesses and their corresponding GTs wherein each of the GTs includes information on locations of first exact rows where each of the bottom lines of the nearest obstacles is truly positioned per each of the columns, and on locations of second exact rows where each of the top lines of the nearest obstacles is truly positioned per each of the columns; and (f) backpropagating the losses, to thereby learn the parameters of the CNN, and a learning device, a testing method, and a testing device using the same.

BACKGROUND OF THE INVENTION

Deep learning is a technology used to cluster or classify objects or data. For example, computers cannot distinguish dogs and cats from photographs alone. But a human can easily distinguish those two. To this end, a method called "machine learning" was devised. It is a technique to allow a computer to classify similar things among lots of data inputted into the computer. When a photo of an animal similar to a dog is inputted, the computer will classify it as a dog photo.

There have already been many machine learning algorithms to classify data. For example, a decision tree, a Bayesian network, a support vector machine (SVM), an artificial neural network, etc. have been developed. The deep learning is a descendant of the artificial neural network.

Deep Convolution Neural Networks (Deep CNNs) are at the heart of the remarkable development in deep learning. CNNs have already been used in the 90's to solve the problems of character recognition, but their use has become as widespread as it is now thanks to recent research. These deep CNNs won the 2012 ImageNet image classification tournament, crushing other competitors. Then, the convolution neural network became a very useful tool in the field of the machine learning.

FIG. 1 is a drawing schematically illustrating a conventional process of a general segmentation by using a conventional CNN.

By referring to FIG. 1, according to the conventional lane detection method, a learning device receives an input image, generates feature maps by multiple convolution operations and non-linear operations like ReLU in multiple convolutional layers, and generates a segmentation result by performing multiple deconvolution operations in multiple deconvolutional layers and SoftMax operations on a last of the feature maps.

On the other hand, a conventional method of a lane segmentation has to segment every pixel in the input image, and check every pixel to determine whether the pixel corresponds to a lane or not. Such the conventional method requires a tremendous amount of computation caused by checking every pixel, which is clearly a problem.

Meanwhile, when performing the lane segmentation for autonomous vehicles, there is no need for segmentation of all objects within the input image, but detecting only obstacles to the autonomous vehicles should suffice.

Thus a new method for detecting only the obstacles within the input image is required.

Also, a new method is required for finding objectnesses corresponding to nearest obstacles, not just for finding the obstacles as lines in the input image with less computation.

SUMMARY OF THE INVENTION

It is an object of the present invention to solve all the aforementioned problems.

It is another object of the present invention to provide a new method of detecting obstacles, for autonomous vehicles.

It is still another object of the present invention to provide a method for fast detection of location of the obstacles with less computation, without checking every pixel in an input image.

It is still yet another object of the present invention to provide a method for detecting boundaries of a road and objectnesses of nearest obstacles on the road with less computation.

In accordance with one aspect of the present invention, there is provided a method for learning parameters of CNNs capable of identifying one or more objectnesses by detecting one or more bottom lines and one or more top lines of one or more nearest obstacles in at least one input image, including steps of: (a) a learning device, if the input image is acquired as a training image, (i) instructing one or more convolutional layers of a first CNN to sequentially generate one or more first encoded feature maps from the input image, and instructing one or more deconvolutional layers of the first CNN to sequentially generate one or more first decoded feature maps from the first encoded feature maps, and (ii) instructing one or more convolutional layers of a second CNN to sequentially generate one or more second encoded feature maps from the input image, and instructing one or more deconvolutional layers of the second CNN to sequentially generate one or more second decoded feature maps from the second encoded feature maps; (b) the learning device, on condition that each cell of a grid with a plurality of rows and a plurality of columns is generated by dividing the first and the second decoded feature maps, with respect to a first direction and a second direction, wherein the first direction is in a direction of the rows of the first and the second decoded feature maps and the second direction is in a direction of the columns thereof, (i) generating at least one first obstacle segmentation result representing each of first specific rows, where each of the bottom lines of each of the nearest obstacles is estimated as being located per each of the columns, by referring to at least one feature of at least one specific first decoded feature map among the first decoded feature maps, and (ii) generating at least one second obstacle segmentation result representing each of second specific rows, where each of the top lines of each of the nearest obstacles is estimated as being located per each of the columns, by referring to at least one feature of at least one specific second decoded feature map among the second decoded feature maps; (c) the learning device estimating the objectnesses corresponding to the nearest obstacles on a road by referring to the first obstacle segmentation result and the second obstacle segmentation result; (d) the learning device generating one or more losses by referring to the objectnesses and their corresponding GTs wherein each of the GTs includes information on locations of first exact rows where each of the bottom lines of the nearest obstacles is truly positioned per each of the columns, and on locations of second exact rows where each of the top lines of the nearest obstacles is truly positioned per each of the columns; and (f) the learning device backpropagating the losses, to thereby learn the parameters of the CNN.

As one example, at the step of (c), the learning device further estimates one or more boundaries of the road by referring to the first obstacle segmentation result and the second obstacle segmentation result, and, at the step of (d), the learning device generates the losses by referring to the boundaries, the objectnesses, and their corresponding GTs.

As one example, at the step of (c), if each difference of each distance between (i) each of the first specific rows where each of the bottom lines of each of the obstacles is estimated as located per each of the columns and (ii) each of the second specific rows where each of the top lines of each of the obstacles is estimated as located per each of the columns is detected as less than a predetermined threshold by referring to the first obstacle segmentation result and the second obstacle segmentation result, the learning device determines that the boundaries are present in the input image, and, if each difference of each distance between (i) each of the first specific rows per each of the columns and (ii) each of the second specific rows per each of the columns is detected as larger than the predetermined threshold, the learning device determines that the objectnesses corresponding to the nearest obstacles are present on the road in the input image.

As one example, the step of (b) includes steps of: (b1) the learning device, supposing that each cell of the grid is generated by dividing the first and the second decoded feature maps with respect to the first direction by first intervals and with respect to the second direction by second intervals, concatenating each of features of each of the rows per each of the columns in a direction of a channel, to thereby generate at least one first reshaped feature map and at least one second reshaped feature map; and (b2) the learning device (i) generating the first obstacle segmentation result by checking each of estimated positions of each of the bottom lines of each of the obstacles on concatenated channels for each of the columns on the first reshaped feature map, wherein the first obstacle segmentation result is generates by a first softmax operation which normalizes each value corresponding to each channel per each of the columns, and (ii) generating the second obstacle segmentation result by checking each of estimated positions of each of the top lines of each of the obstacles starting upward from each of the bottom lines on concatenated channels for each of the columns on the second reshaped feature map, wherein the second obstacle segmentation result is generated by a second softmax operation which normalizes each value corresponding to each channel per each of the columns.

As one example, each of the columns includes one or more pixels in the first direction, and each of the rows includes one or more pixels in the second direction.

As one example, the GTs include information representing on which row each of the bottom lines and each of the top lines of each of the nearest obstacles are truly located among the rows, per each of the columns, resulting from dividing the input image into $N_c$ rows, and wherein the first obstacle segmentation result and the second obstacle segmentation result include information representing on which row each of the bottom lines and each of the top lines of each of the obstacles are estimated as located among the rows, per each of the columns, resulting from dividing the input image into $N_c$ rows.

As one example, at the step of (b), a third obstacle segmentation result is generated such that the third obstacle segmentation result includes information on the first and the second specific rows with top two highest values for each of the columns of concatenated features, wherein the concatenated features are generated by using features of the first and the second decoded feature maps, and where the third obstacle segmentation result is generated by a third softmax operation which normalizes each value corresponding to each of the rows per each of the columns of the concatenated features.

In accordance with another aspect of the present invention, there is provided a method for testing CNNs capable of identifying one or more objectnesses for training by detecting one or more bottom lines and one or more top lines of one or more nearest obstacles for testing in at least one test image, including steps of: (a) a testing device acquiring the test image, on condition that a learning device has performed processes of (i) instructing one or more convolutional layers of a first CNN to sequentially generate one or more first encoded feature maps for training from at least one input image acquired as a training image, and instructing one or more deconvolutional layers of the first CNN to sequentially generate one or more first decoded feature maps for training from the first encoded feature maps for training, and instructing one or more convolutional layers of a second CNN to sequentially generate one more second encoded feature maps for training from the input image, and instructing one or more deconvolutional layers of the second CNN to sequentially generate one or more second decoded feature maps for training from the second encoded feature maps for training, (ii) assuming that each cell of a grid with a plurality of rows and a plurality of columns is generated by dividing the first and the second decoded feature maps for training, with respect to a first direction and a second direction, wherein the first direction is in a direction of the rows of the first and the second decoded feature maps for training and the second direction is in a direction of the columns thereof, generating at least one first obstacle segmentation result for training representing each of first specific rows for training, where each of the bottom lines of each of one or more nearest obstacles for training is estimated as being located per each of the columns, by referring to at least one feature for training of at least one specific first decoded feature map for training among the first decoded feature maps for training, and generating at least one second obstacle segmentation result for training representing each of second specific rows for training, where each of the top lines of each of the nearest obstacles for training estimated as being located per each of the columns, by referring to at least one feature for training of at least one specific second decoded feature map for training among the second decoded feature maps for training, (iii) estimating the objectnesses for training corresponding to the nearest obstacles for training on a road by referring to the first obstacle segmentation result for training and the second obstacle segmentation result for training, (iv) generating one or more losses by referring to the objectnesses for training and their corresponding GTs wherein each of the GTs includes information on locations of first exact rows where each of the bottom lines of the nearest obstacles for training is truly positioned per each of the columns, and on locations of second exact rows where each of the top lines of the nearest obstacles for training is truly positioned per each of the columns, and (v) backpropagating the losses, to thereby learn the parameters of the CNNs; (b) the testing device (i) instructing the convolutional layers of the first CNN to sequentially generate one or more first encoded feature maps for testing from the test image, and instructing the deconvolutional layers of the first CNN to sequentially generate one or more first decoded feature maps for testing from the first encoded feature maps for testing, and (ii) instructing the convolutional layers of the second CNN to sequentially generate one or more second encoded feature maps for testing from the test image, and instructing the deconvolutional layers of the second CNN to sequentially generate one or more second decoded feature maps for testing from the second encoded feature maps for testing; (c) the testing device, assuming that each cell of a grid with a plurality of rows and a plurality of columns is generated by dividing the first and the second decoded feature maps for testing, with respect to a first direction and a second direction, wherein the first direction is in a direction of the rows of the first and the second decoded feature maps for testing and the second direction is in a direction of the columns thereof, (i) generating at least one first obstacle segmentation result for testing representing each of first specific rows for testing, where each of the bottom lines of each of the nearest obstacles for testing is estimated as being located per each of the columns, by referring to at least one feature for testing of at least one specific first decoded feature map for testing among the first decoded feature maps for testing, and (ii) generating at least one second obstacle segmentation result for testing representing each of second specific rows for testing, where each of the top lines of each of the nearest obstacles for testing is estimated as being located per each of the columns, by referring to at least one feature for testing of at least one specific second decoded feature map for testing among the second decoded feature maps for testing; and (d) the testing device estimating the objectnesses for testing corresponding to the nearest obstacles for testing on a road by referring to the first obstacle segmentation result for testing and the second obstacle segmentation result for testing.

As one example, at the step of (d), the testing device further estimates one or more boundaries for testing of the road by referring to the first obstacle segmentation result for testing and the second obstacle segmentation result for testing, wherein, at the process of (iv), the learning device has generated the losses by referring to one or more boundaries for training, the objectnesses for training, and their corresponding GTs.

As one example, at the step of (d), if each difference of each distance between (i) each of the first specific rows for testing where each of the bottom lines of each of the obstacles for testing is estimated as located per each of the columns and (ii) each of the second specific rows for testing where each of the top lines of each of the obstacles for testing is estimated as located per each of the columns is detected as less than a predetermined threshold by referring to the first obstacle segmentation result for testing and the second obstacle segmentation result for testing, the testing device determines that the boundaries for testing are present in the test image, and, if each difference of each distance between (i) each of the first specific rows for testing per each of the columns and (ii) each of the second specific rows for testing per each of the columns is detected as larger than the predetermined threshold, the testing device determines that the objectnesses for testing corresponding to the nearest obstacles for testing are present on the road in the test image.

As one example, the step of (c) includes steps of: (c1) the testing device, supposing that each cell of the grid is generated by dividing the first and the second decoded feature maps for testing with respect to the first direction by first intervals and with respect to the second direction by second intervals, concatenating each of features for testing of each of the rows per each of the columns in a direction of a channel, to thereby generate at least one first reshaped feature map for testing and at least one second reshaped feature map for testing; and (c2) the testing device (i) generating the first obstacle segmentation result for testing by checking each of estimated positions of each of the bottom lines of each of the obstacles for testing on concatenated channels for each of the columns on the first reshaped feature map for testing, wherein the first obstacle segmentation result for testing is generated by a first softmax operation which normalizes each value corresponding to each channel per each of the columns, and (ii) generating the second obstacle segmentation result for testing by checking each of estimated positions of each of the top lines of each of the obstacles for testing starting upward from each of the bottom lines on concatenated channels for each of the columns on the second reshaped feature map for testing, wherein the second obstacle segmentation result for testing is generated by a second softmax operation which normalizes each value corresponding to each channel per each of the columns.

As one example, each of the columns includes one or more pixels in the first direction, and each of the rows includes one or more pixels in the second direction.

As one example, the GTs include information representing on which row each of the bottom lines and each of the top lines. of each of the nearest obstacles for training are truly located among the rows, per each of the columns, resulting from dividing the input image into $N_c$ rows, wherein the first obstacle segmentation result for testing and the second obstacle segmentation result for testing include information representing on which row each of the bottom lines and each of the top lines of each of the obstacles for testing are estimated as located among the rows, per each of the columns, resulting from dividing the test image into $N_c$ rows.

As one example, at the step of (c), a third obstacle segmentation result for testing is generated such that the third obstacle segmentation result for testing includes information on the first and the second specific rows for testing with top two highest values for each of the columns of concatenated features for testing, wherein the concatenated features for testing are generated by using features for testing of the first and the second decoded feature maps for testing, and wherein the third obstacle segmentation result for testing is generated by a third softmax operation which normalizes each value corresponding to each of the rows per each of the columns of the concatenated features for testing.

In accordance with still another aspect of the present invention, there is provided a learning device for learning parameters of CNNs capable of identifying one or more objectnesses by detecting one or more bottom lines and one or more top lines of one or more nearest obstacles in at least one input image, including: a communication part for acquiring the input image as a training image; and a processor for performing processes of (I) (i) instructing one or more convolutional layers of a first CNN to sequentially generate one or more first encoded feature maps from the input image, and instructing one or more deconvolutional layers of the first CNN to sequentially generate one or more first decoded feature maps from the first encoded feature maps, and (ii) instructing one or more convolutional layers of a second CNN to sequentially generate one or more second encoded feature maps from the input image, and instructing one or more deconvolutional layers of the second CNN to sequentially generate one or more second decoded feature maps from the second encoded feature maps, (II) on condition that each cell of a grid with a plurality of rows and a plurality of columns is generated by dividing the first and the second decoded feature maps, with respect to a first direction and a second direction, wherein the first direction is in a direction of the rows of the first and the second decoded feature maps and the second direction is in a direction of the columns thereof, (i) generating at least one first obstacle segmentation result representing each of first specific rows, where each of the bottom lines of each of the nearest obstacles is estimated as being located per each of the columns, by referring to at least one feature of at least one specific first decoded feature map among the first decoded feature maps, and (ii) generating at least one second obstacle segmentation result representing each of second specific rows, where each of the top lines of each of the nearest obstacles is estimated as being located per each of the columns, by referring to at least one feature of at least one specific second decoded feature map among the second decoded feature maps, (III) estimating the objectnesses corresponding to the nearest obstacles on a road by referring to the first obstacle segmentation result and the second obstacle segmentation result, (IV) generating one or more losses by referring to the objectnesses and their corresponding GTs wherein each of the GTs includes information on locations of first exact rows where each of the bottom lines of the nearest obstacles is truly positioned per each of the columns, and on locations of second exact rows where each of the top lines of the nearest obstacles is truly positioned per each of the columns, and (V) backpropagating the losses, to thereby learn the parameters of the CNN.

As one example, at the process of (III), the processor further estimates one or more boundaries of the road by referring to the first obstacle segmentation result and the second obstacle segmentation result, and, at the process of (IV), the processor generates the losses by referring to the boundaries, the objectnesses, and their corresponding GTs.

As one example, at the process of (III), if each difference of each distance between (i) each of the first specific rows where each of the bottom lines of each of the obstacles is estimated as located per each of the columns and (ii) each of the second specific rows where each of the top lines of each of the obstacles is estimated as located per each of the columns is detected as less than a predetermined threshold by referring to the first obstacle segmentation result and the second obstacle segmentation result, the processor determines that the boundaries are present in the input image, and, if each difference of each distance between (i) each of the first specific rows per each of the columns and (ii) each of the second specific rows per each of the columns is detected as larger than the predetermined threshold, the processor determines that the objectnesses corresponding to the nearest obstacles are present on the road in the input image.

As one example, the process of (II) includes processes of: (II-1) supposing that each cell of the grid is generated by dividing the first and the second decoded feature maps with respect to the first direction by first intervals and with respect to the second direction by second intervals, concatenating each of features of each of the rows per each of the columns in a direction of a channel, to thereby generate at least one first reshaped feature map and at least one second reshaped feature map; and (II-2) (i) generating the first obstacle segmentation result by checking each of estimated positions of each of the bottom lines of each of the obstacles on concatenated channels for each of the columns on the first reshaped feature map, wherein the first obstacle segmentation result is generated by a first softmax operation which normalizes each value corresponding to each channel per each of the columns, and (ii) generating the second obstacle segmentation result by checking each of estimated positions of each of the top lines of each of the obstacles starting upward from each of the bottom lines on concatenated channels for each of the columns on the second reshaped feature map, wherein the second obstacle segmentation result is generated by a second softmax operation which normalizes each value corresponding to each channel per each of the columns.

As one example, each of the columns includes one or more pixels in the first direction, and each of the rows includes one or more pixels in the second direction.

As one example, the GTs include information representing on which row each of the bottom lines and each of the top lines of each of the nearest obstacles are truly located among the rows, per each of the columns, resulting from dividing the input image into $N_c$ rows, and wherein the first obstacle segmentation result and the second obstacle segmentation result include information representing on which row each of the bottom lines and each of the top lines of each of the obstacles are estimated as located among the rows, per each of the columns, resulting from dividing the input image into $N_c$ rows.

As one example, at the process of (II), a third obstacle segmentation result is generated such that the third obstacle segmentation result includes information on the first and the second specific rows with top two highest values for each of the columns of concatenated features, wherein the concatenated features are generated by using features of the first and the second decoded feature maps, and wherein the third obstacle segmentation result is generated by a third softmax operation which normalizes each value corresponding to each of the rows per each of the columns of the concatenated features.

In accordance with still yet another aspect of the present invention, there is provided a testing device for testing CNNs capable of identifying one or more objectnesses for training by detecting one or more bottom lines and one or more top lines of one or more nearest obstacles for testing in at least one test image, including: a communication part for acquiring the test image, on condition that a learning device has performed processes of (1) instructing one or more convolutional layers of a first CNN to sequentially generate one or more first encoded feature maps for training from at least one input image acquired as a training image, and instructing one or more deconvolutional layers of the first CNN to sequentially generate one or more first decoded feature maps for training from the first encoded feature maps for training, and instructing one or more convolutional layers of a second CNN to sequentially generate one or more second encoded feature maps for training from the input image, and instructing one or more deconvolutional layers of the second CNN to sequentially generate one or more second decoded feature maps for training from the second encoded feature maps for training, (2) assuming that each cell of a grid with a plurality of rows and a plurality of columns is generated by dividing the first and the second decoded feature maps for training, with respect to a first direction and a second direction, wherein the first direction is in a direction of the rows of the first and the second decoded feature maps for training and the second direction is in a direction of the columns thereof, generating at least one first obstacle segmentation result for training representing each of first specific row for training, where each of the bottom lines of each of one or more nearest obstacles for training is estimated as being located per each of the columns, by referring to at least one feature for training of at least one specific first decoded feature map for training among the first decoded feature maps for training, and generating at least one second obstacle segmentation result for training representing each of second specific rows for training, where each of the top lines of each of the nearest obstacles for training is estimated as being located per each of the columns, by referring to at least one feature for training of at least one specific second decoded feature map for training among the second decoded feature maps for training, (3) estimating the objectnesses for training corresponding to the nearest obstacles for training on a road by referring to the first obstacle segmentation result for training and the second obstacle segmentation result for training, (4) generating one or more losses by referring to the objectnesses for training and their corresponding GTs wherein each of the GTs includes information on locations of first exact rows where each of the bottom lines of the nearest obstacles for training is truly positioned per each of the columns, and on locations of second exact rows where each of the top lines of the nearest obstacles for training is truly positioned per each of the columns, and (5) backpropagating the losses, to thereby learn the parameters of the CNNs; and a processor for performing processes of (I) (i) instructing the convolutional layers of the first CNN to sequentially generate one or more first encoded feature maps for testing from the test image, and instructing the deconvolutional layers of the first CNN to sequentially generate one or more first decoded feature maps for testing from the first encoded feature maps for testing, and (ii) instructing the convolutional layers of the second CNN to sequentially generate one or more second encoded feature maps for testing from the test image, and instructing the deconvolutional layers of the second CNN to sequentially generate one or more second decoded feature maps for testing from the second encoded feature maps for testing, (II) assuming that each cell of a grid with a plurality of rows and a plurality of columns is generated by dividing the first and the second decoded feature maps for testing, with respect to a first direction and a second direction, wherein the first direction is in a direction of the rows of the first and the second decoded feature maps for testing and the second direction is in a direction of the columns thereof, (i) generating at least one first obstacle segmentation result for testing representing each of first specific rows for testing, where each of the bottom lines of each of the nearest obstacles for testing is estimated as being located per each of the columns, by referring to at least one feature for testing of at least one specific first decoded feature map for testing among the first decoded feature maps for testing, and (ii) generating at least one second obstacle segmentation result for testing representing each of second specific rows for testing, where each of the top lines of each of the nearest obstacles for testing is estimated as being located per each of the columns, by referring to at least one feature for testing of at least one specific second decoded feature map for testing among the second decoded feature maps for testing, and (III) estimating the objectnesses for testing corresponding to the nearest obstacles for testing on a road by referring to the first obstacle segmentation result for testing and the second obstacle segmentation result for testing.

As one example, at the process of (III), the processor further estimates one or more boundaries for testing of the road by referring to the first obstacle segmentation result for testing and the second obstacle segmentation result for testing, wherein, at the process of (4), the learning device has generated the losses by referring to one or more boundaries for training, the objectnesses for training, and their corresponding GTs.

As one example, at the process of (III), if each difference of each distance between (i) each of the first specific rows for testing where each of the bottom lines of each of the obstacles for testing is estimated as located per each of the columns and (ii) each of the second specific rows for testing where each of the top lines of each of the obstacles for testing is estimated as located per each of the columns is detected as less than a predetermined threshold by referring to the first obstacle segmentation result for testing and the second obstacle segmentation result for testing, the processor determines that the boundaries for testing are present in the test image, and, if each difference of each distance between (i) each of the first specific rows testing per each of the columns and (ii) each of the second specific rows for testing per each of the columns is detected as larger than the predetermined threshold, the processor determines that the objectnesses for testing corresponding to the nearest obstacles for testing are present on the road in the test image.

As one example, the process of (II) includes processes of: (II-1) supposing that each cell of the grid is generated by dividing the first and the second decoded feature maps for testing with respect to the first direction by first intervals and with respect to the second direction by second intervals, concatenating each of features for testing of each of the rows per each of the columns in a direction of a channel, to thereby generate at least one first reshaped feature map for testing and at least one second reshaped feature map for testing; and (II-2) (i) generating the first obstacle segmentation result for testing by checking each of estimated positions of each of the bottom lines of each of the obstacles for testing on concatenated channels for each of the columns on the first reshaped feature map for testing, wherein the first obstacle segmentation result for testing is generated by a first softmax operation which normalizes each value corresponding to each channel per each of the columns, and (ii) generating the second obstacle segmentation result for testing by checking each of estimated positions of each of the top lines of each of the obstacles for testing starting upward from each of the bottom lines on concatenated channels for each of the columns on the second reshaped feature map for testing, wherein the second obstacle segmentation result for testing is generated by a second softmax operation which normalizes each value corresponding to each channel per each of the columns.

As one example, each of the columns includes one or more pixels in the first direction, and each of the rows includes one or more pixels in the second direction.

As one example, the GTs include information representing on which row each of the bottom lines and each of the top lines of each of the nearest obstacles for training are truly located among the rows, per each of the columns, resulting from dividing the input image into $N_c$ rows, wherein the first obstacle segmentation result for testing and the second obstacle segmentation result for testing include information representing on which row each of the bottom lines and each of the top lines of each of the obstacles for testing are estimated as located among the rows, per each of the columns, resulting from dividing the test image into $N_c$ rows.

As one example, at the process of (II), a third obstacle segmentation result for testing is generated such that the third obstacle segmentation result for testing includes information on the first and the second specific rows for testing with top two highest values for each of the columns of concatenated features for testing, wherein the concatenated features for testing are generated by using features for testing of the first and the , second decoded feature maps testing, and wherein the third obstacle segmentation result for testing is generated by a third softmax operation which normalizes each value corresponding to each of the rows per each of the columns of the concatenated features for testing.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 5 is a drawing exemplary illustrating the input image and its corresponding GT image for detecting the nearest obstacles in accordance with the present invention.

FIG. 6 is a drawing exemplary illustrating operations on the input image to describe a testing method of the CNN for detecting the nearest obstacles in accordance with the present invention.

DETAILED DESCRIPTION OF THE PREFERRED EMBODIMENT

Figure 1:
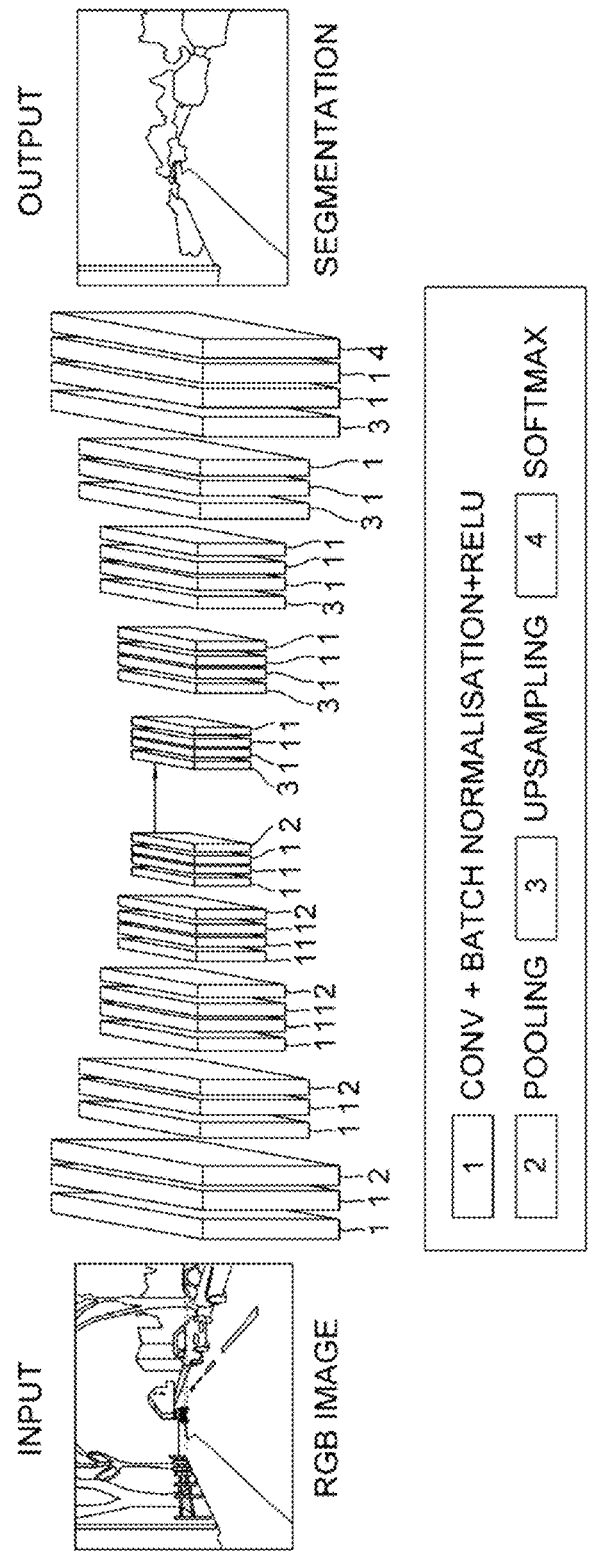
FIG. 1 is a drawing schematically illustrating a conventional process of a general segmentation by using a conventional CNN.

In the following detailed description, reference is made to accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to the present invention to be carried out easily, the example embodiments of the present invention by referring to attached diagrams will be explained in detail as shown below.

The present invention provides an algorithm capable of detecting nearest obstacles fast with less computation in a high-resolution image. It is an object of detecting the nearest obstacles in accordance with the present invention to identify at least one boundary between a road and at least one obstacle in an input image. Supposing that a direction of rows of the input image is a first direction, and that the direction of columns of the input image is a second direction, the first direction may be divided by first intervals to form multiple columns, and the second direction may be divided by second intervals to form multiple rows, and thus a grid may be generated. Using information on specific rows for each of the columns where each nearest obstacle is estimated as located by checking each of the columns starting from its corresponding lowest cell of the grid along the second direction, locations of the nearest obstacles on a road may be detected. Also, the present invention reduces computational load by (i) a learning process with multi-loss using high-resolution information and (ii) a testing process using low-resolution features only.

Figure 2:
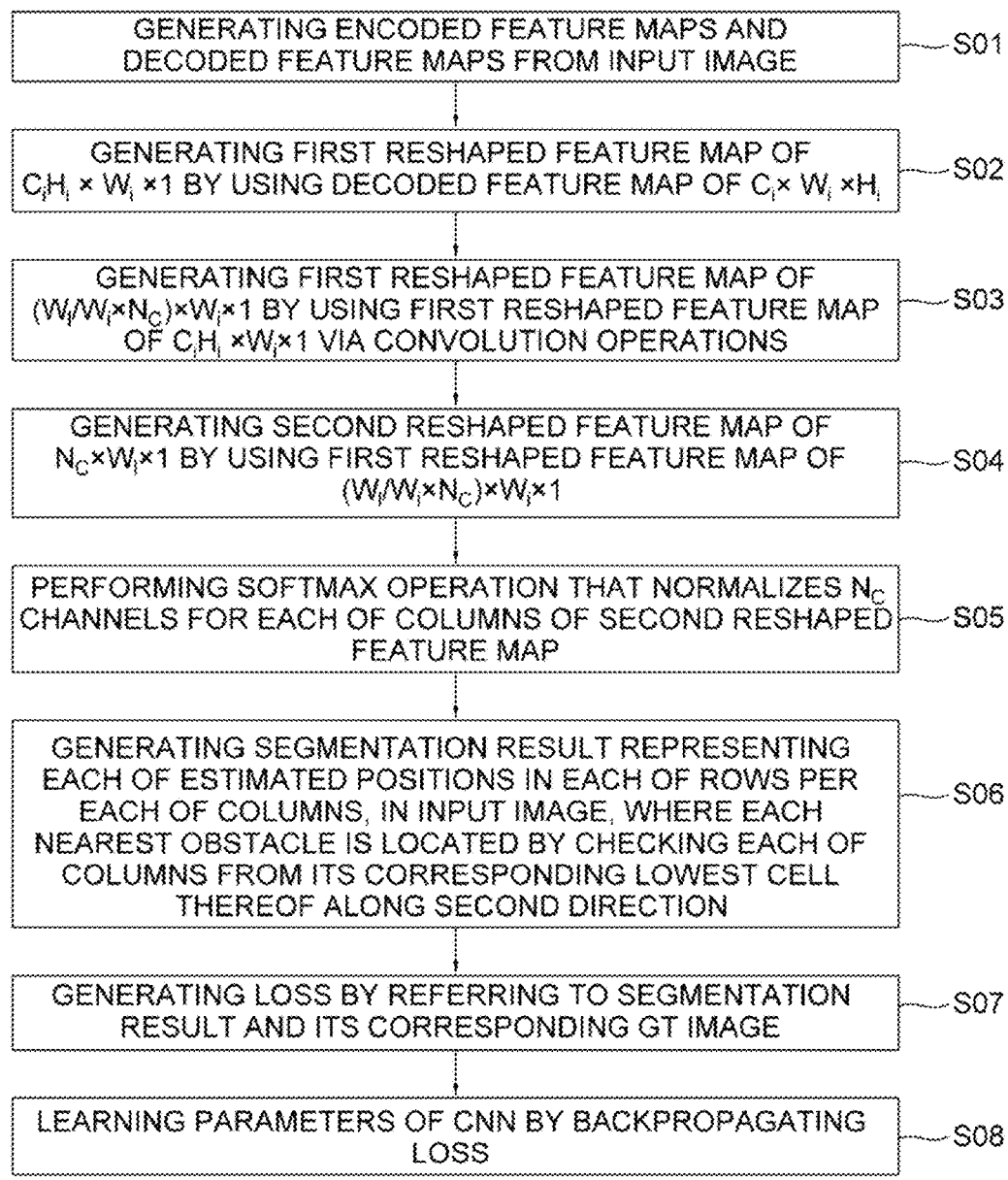
FIG. 2 is a flow chart schematically illustrating a learning method of a CNN for detecting nearest obstacles in accordance with the present invention.
Figure 3:
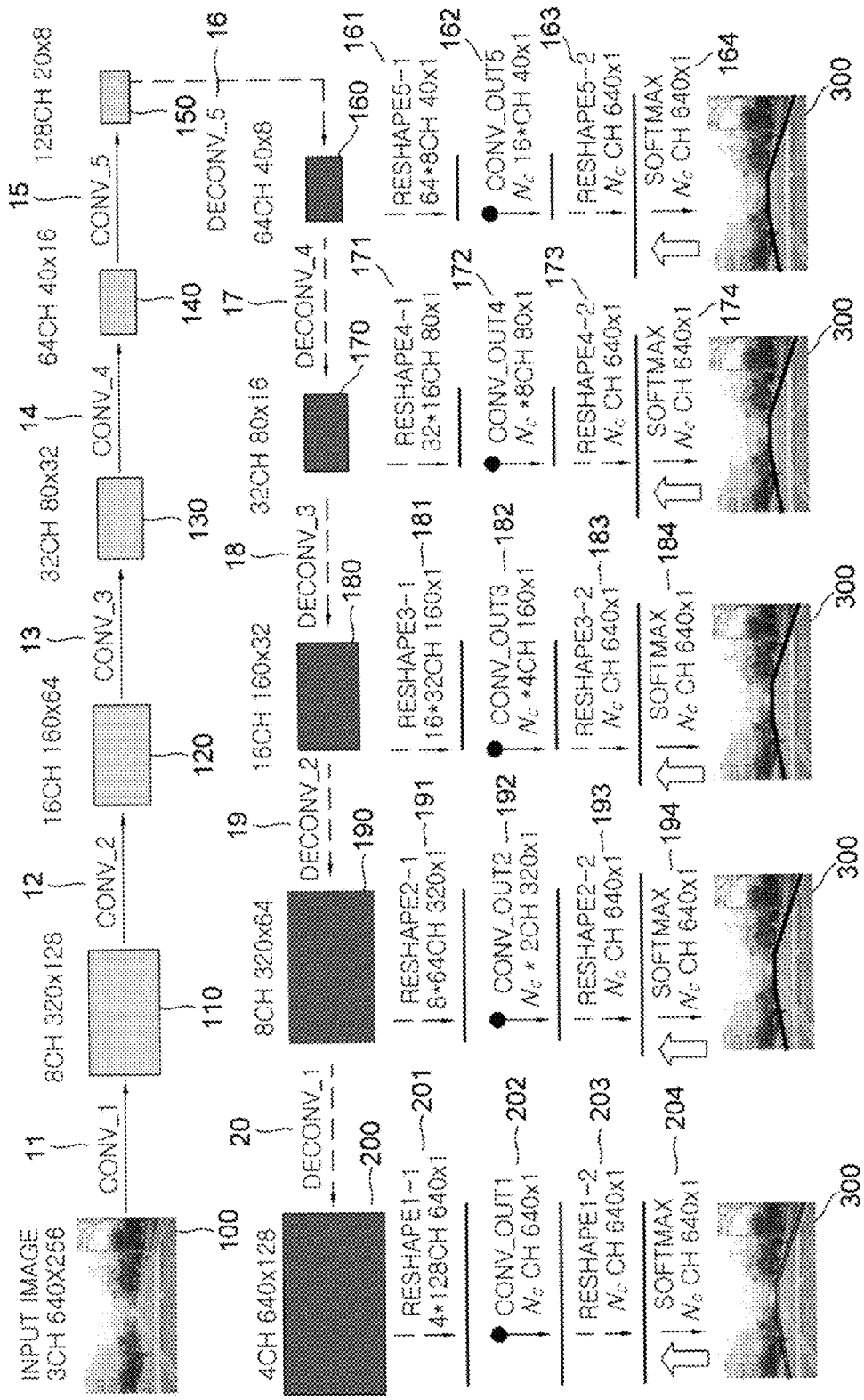
FIG. 3 is a drawing exemplary illustrating a process of operations on an input image to describe the learning method of the CNN for detecting the nearest obstacles in accordance with the present invention.

FIG. 2 is a flow chart schematically illustrating a learning method of a CNN for detecting the nearest obstacles in accordance with the present invention. FIG. 3 is a drawing exemplary illustrating operations on the input image to describe the learning method of the CNN for detecting the nearest obstacles in accordance with the present invention.

By referring to FIGS. 2 and 3, processes of the learning method of the CNN for detecting the nearest obstacles in accordance with the present invention is described in detail as follows.

A process of detecting the nearest obstacles in accordance with the present invention may start with a step S01 of generating encoded feature maps and decoded feature maps from at least one input image. At the step of S01, if a learning device receives the input image as a training image, the learning device may instruct a first to an n-th convolutional layers to respectively and sequentially generate a first encoded feature map to an n-th encoded feature map from the training image, where the CNN for detecting the nearest obstacles may include the first to the n-th convolutional layers. Further, the CNN for detecting the nearest obstacles may include an n-th to a first deconvolutional layers corresponding to the first to the n-th convolutional layers, and the learning device may instruct the n-th to the first deconvolutional layers to respectively and sequentially generate an n-th decoded feature map to a first decoded feature map from the n-th encoded feature map.

For example, by referring to FIG. 3, the CNN for detecting the nearest obstacles may include the first convolutional layer 11 to a fifth convolutional layer 15 and a fifth deconvolutional layer 16 to the first deconvolutional layer 20, and the learning device may receive the training image 100 having a size of 640×256 with 3 ch. This training image is inputted into the first convolutional layer 11 which may generate the first encoded feature map 110 having a size of 320×128 with 8 ch, the second convolutional layer 12 which may generate the second encoded feature map 120 having a size of 160×64 with 16 ch, the third convolutional layer 13 which may generate the third encoded feature map 130 having a size of 80×32 with 32 ch, the fourth convolutional layer 14 which may generate the fourth encoded feature map 140 having a size of 40×16 with 64 ch, and the fifth convolutional layer 15 which may generate the fifth encoded feature map 150 having a site of 20×8 with 128 ch.

As such, the convolutional layers may increase channels of the input image or the feature maps, and may reduce their horizontal and vertical sizes, to thereby generate the encoded feature maps. For example, the second convolutional layer 12 to the fifth convolutional layer 15 may double the channels of the inputted feature map and may reduce its horizontal and vertical sizes in half, to thereby generate the encoded feature maps.

Meanwhile, the learning device may instruct the n-th deconvolutional layer corresponding to the n-th convolutional layer to increase a horizontal size of the n-th encoded feature map by a multiplier to thereby generate the n-th decoded feature map. For example, by referring to FIG. 3, the learning device may instruct the fifth deconvolutional layer 16 to generate the fifth decoded feature map 160 having a size of 40×8 with 64 ch from the fifth encoded feature map 150 having a size of 20×8 with 128 ch.

In general, a deconvolutional layer reduces the number of channels and increases horizontal and vertical sizes, however, the n-th deconvolutional layer in accordance with the present invention reduces the number of the channels of the n-th encoded feature map and increases the horizontal size by the multiplier, e.g., two for doubling, but keeps the vertical size of the feature map. The reason is that, as aforementioned, determining which position has the highest score among the columns of the grid is enough for the present invention. That is, the present invention does not need to check every pixel, unlike a conventional segmentation, nor has need for increase of the vertical size. The present invention provides method that horizontal resolutions of input and output are the same, thus, does not have a problem of lowering of horizontal resolution according to conventional techniques. Although a high vertical resolution is preferred, that will require too much computational load. Therefore, the present invention proposes a method that only the horizontal resolution is increased to detect the nearest obstacles with less computation. For this purpose, as aforementioned, the n-th deconvolutional layer may reduce the number of the channels of the n-th encoded feature map, and may increase the horizontal size by the multiplier, e.g., two for doubling, but does not change the vertical size.

Describing the process of decoding by referring to FIG. 3 again, the learning device may instruct the fourth deconvolutional layer 17 to generate the fourth decoded feature map 170 having a size of 80×16 with 32 ch from the fifth decoded feature map 160 having a size of 40×8 with 64 ch, the third deconvolutional layer 18 to generate the third decoded feature map 180 having a size of 160×32 with 16 ch from the fourth decoded feature map 170 having a size of 80×16 with 32 ch, the second deconvolutional layer 19 to generate the second decoded feature map 190 having a size of 320×64 with 8 ch from the third decoded feature map 180 having a size of 160×32 with 16 ch, and the first deconvolutional layer 20 to generate the first decoded feature map 200 having a size of 640×128 with 4 ch from the second decoded feature map 190 having a size of 320×64 with 8 ch.

Thus, the deconvolutional layers may reduce the number of feature maps inputted, and may increase the horizontal and the vertical sizes, to thereby generate the decoded feature maps. For example, the fourth deconvolutional layer 17 to the first deconvolutional layer 20 may reduce the number of the channels in half and may double each of the horizontal and the vertical sizes of the inputted feature map, to thereby generate the decoded feature maps.

Meanwhile, the convolutional layers may perform at least one operation of convolution, max pooling, and ReLU, and the deconvolutional layers may perform at least one operation of deconvolution and ReLU.

Then, by referring to FIG. 2, the learning device may generate a first reshaped feature map with a size of $C_iH_i \times W_i \times 1$ by using the decoded feature map with a size of $C_i \times W_iH_i$, where the $C_i$ is the number of the channels, the $W_i$ is a size of the columns, and the $H_i$ is a size of the rows of the decoded feature map at a step of S02.

That is, at a reshaping process in accordance with the present invention, supposing that each cell of the grid with a plurality of rows and a plurality of columns is generated by dividing the at least one decoded feature map with respect to the first direction by the first intervals and with respect to the second direction by the second intervals, the learning device may concatenate each of features of each of the rows per each of the columns in the direction of the channel, to thereby generate at least one reshaped feature map.

Figure 4:
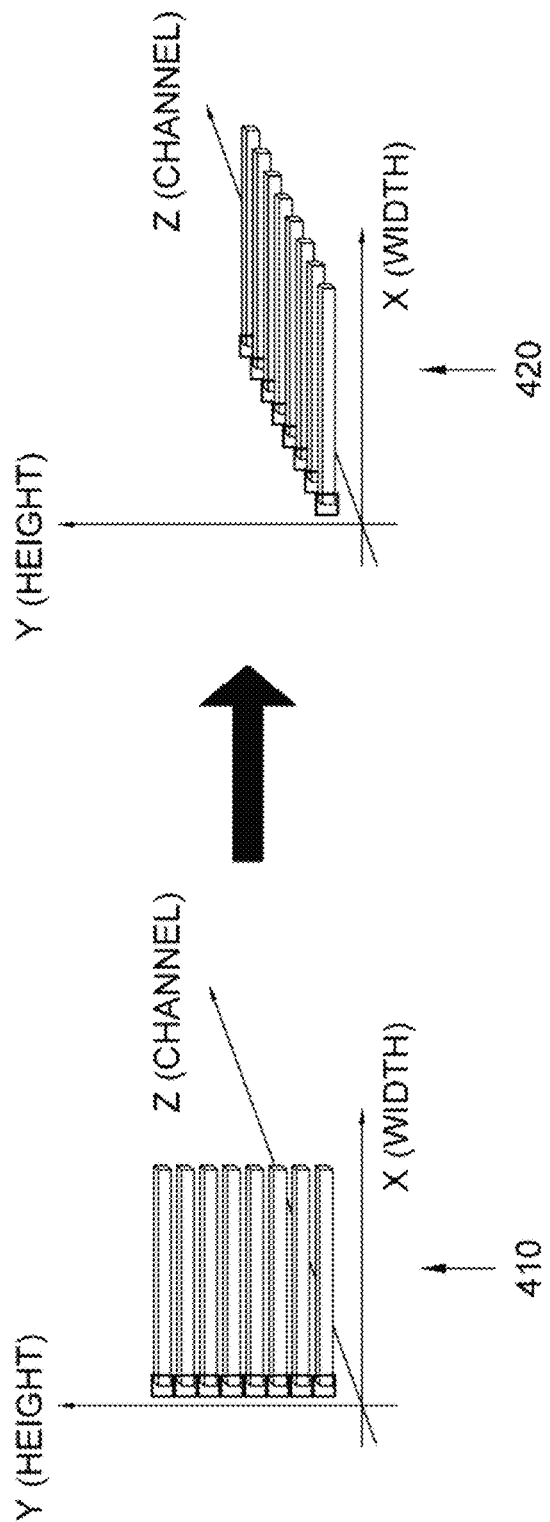
FIG. 4 is a drawing schematically illustrating a reshaping process for detecting the nearest obstacles in accordance with the present invention.

FIG. 4 is a drawing schematically illustrating the reshaping process for detecting the nearest obstacles in accordance with the present invention.

By referring to FIG. 4, at the reshaping process, a decoded feature map may be divided into rows as in the illustrated feature map 410, and each of the features of each of the rows per each of the columns may be concatenated in the direction of the channel as in the illustrated feature map 420. Thus, a feature map with a size of (C×W×H) may be converted into a feature map with a size of ((C×H)×W×1).

In the example of FIG. 4, each square with thick lines on the feature map 410 represents each feature in each row corresponding to the first column of the decoded feature map. Such features in each row are concatenated for each column in the direction of the channel. If the feature map 410 has 8 rows, the feature map 420 may have eight times the number of the channels and an eighth of the height of the feature map 410.

In the example of FIG. 3, the fifth decoded feature map 160 having a size of 40×8 with 64 ch may be converted to the first reshaped feature map 161 having a size of 40×1 with 64*8 ch by a first reshaping process. i.e., RESHAPE 5-1, the fourth decoded feature map 170 having a sire of 80×16 with 32 ch may be converted to the first reshaped feature map 171 a size of 80×1 with 32*16 ch by a first reshaping process, i.e., RESHAPE 4-1, the third decoded feature map 180 having a size of 160×32 with 16 ch may be converted to the first reshaped feature map 181 having a size of 160×1 with 16*32 ch by a first reshaping process, i.e., RESHAPE 3-1, the second decoded feature map 190 having a size of 320×64 with 8 ch may be converted to the first reshaped feature map 191 having a size of 320×1 with 8*64 ch by a first reshaping process, i.e., RESHAPE 2-1, and the first decoded feature map 200 having a size of 640×128 with 4 ch may be converted to the first reshaped feature map 201 having a size of 640×1 with 4*128 ch by a first reshaping process, i.e., RESHAPE 1-1.

For reference, although the first reshaping process is illustrated in FIG. 3 as performed on every decoded feature map, it is not a requirement that every decoded feature map be reshaped, therefore, reshaping a part of the decoded feature maps should suffice.

Then, at a step of S03, the first reshaped feature map with a size of $C_i H_i \times W_i \times 1$ may be converted to the first reshaped feature map with a size of $$\left(\frac{W_I}{W_i} \times N_c\right) \times W_i \times 1$$

by the convolution operations. Herein, the $W_I$ is a column size of the training image and the $W_i$ is the size of the columns of the decoded feature map. The convolution operation is a 1×1 convolution, whose operands are cells in the grid which range over all of the channels but over just one unit horizontally and vertically, to find out where each of bottom lines of the nearest obstacles is positioned in each of $N_c$ columns of each first reshaped feature map, where $N_c$ is the number the second direction of the input image is divided into. All information on the decoded feature maps along the column direction has been integrated into the channels, for simultaneous operations on all the information, at the first reshaping process, therefore, the convolution operation makes it possible to check all pieces of information on the channels, to thereby find out where each of the bottom lines of each of the nearest obstacles is positioned for each column.

Clearly, in case of the example of the fifth decoded feature map 160, the first reshaping operation and the 1×1 convolution operation may be performed simultaneous if an 8×1 convolution without reshaping is performed. That is, if a height of a specified feature map is N, N×1 convolution may be used. However, in general, the 1×1 convolution operation is implemented on hardware for quick calculation, although an 8×1 kernel or N33 1 kernel, which rarely used, is very slow on calculation. Therefore, it is more effective to separate the reshaping operation and the 1×1 convolution operation.

By referring to a result of the 1×1 convolution operation, if the column size of the inputted feature map is $W_i$ and the column size of the original image is $W_I$, the inputted feature map may be converted to have channels of $$\frac{W_I}{W_i} \times N_c.$$

In the example of FIG. 3, the first reshaped feature map 161 having a size of 40×1 with 64*8 ch of the fifth decoded feature map may be converted to the first reshaped feature map 162 having a size of 40×1 with $N_c$*16 ch by the 1×1 convolution operation, the first reshaped feature map 171 having a size of 80×1 with 32*16 ch of the fourth decoded feature map may converted to the first reshaped feature map 172 having a size of 80×1 with $N_c$*8 ch by the 1×1 convolution operation, the first reshaped feature map 181 having a size of 160×1 with 16*32 ch of the third decoded feature map be converted to the first reshaped feature map 182 having a size of 160×1 with $N_c$*4 ch by the 1×1 convolution operation, the first reshaped feature map 191 having a size of 320×1 with 8*64 ch of the second decoded feature map may be converted to the first reshaped feature map 192 having a size of 320×1 with $N_c$*3 ch by the 1×1 convolution operation, and the first reshaped feature map 201 having a size of 640×1 with 4*128 ch of the first decoded feature map may be converted to the first reshaped feature map 202 having a size of 640×1 with $N_c$ ch by the 1×1 convolution operation.

By referring to FIG. 2 again, at a step of S04, the first reshaped feature map having a size of $$\left(\frac{W_I}{W_i} \times N_c\right) \times W_i \times 1$$

may be converted to a second reshaped feature map having a size of $N_c \times W_I \times 1$. Herein, the $N_c$ is the number of the rows into which the second direction of the input image is divided for specifying where each of the bottom lines of each of the nearest obstacles is located on each of the columns.

Then at a step of S05, a softmax operation is performed that normalizes each of values corresponding to the $N_c$ channels for each of the columns of the second reshaped feature map, and at a step of S06, the segmentation result is generated representing each of estimated positions of each of the bottom lines of each of the nearest obstacles in each of the specific rows, per each of the columns in the input image, where each of the nearest obstacles is estimated as located by checking each of the columns from its corresponding lowest cell therein along the second direction.

At the step of S04, i.e., the second reshaping process, the outputted feature map having a size of $$\left(\frac{W_I}{W_i} \times N_c\right) \times W_i \times 1$$

may be modified to have a size of $N_c W_I \times 1$, with its data fixed but only its shape changed. At the step of S05, i.e., the softmax process, the values of the $N_c$ channels per column may be normalized so that their values range from 0 to 1, then each position of each of the bottom lines of each of the nearest obstacles per each of the columns may be estimated by searching each specific channel with each corresponding highest value by referring to the normalized values.

Accordingly, feature maps may be generated by the 1×1 convolution operation at the step of S03 and the reshaping operation at the step of S04, such that each of the estimated positions of the each of the bottom lines of the each of the nearest obstacles among the rows per each of the columns may be allowed to have each corresponding highest value, and the rest of positions, i.e., the rest of rows, among the rows per each of the columns may be allowed to have lower values. The softmax operation at the step of S05 may be used for finding each largest value among each of the $N_c$ values for each column of the input image then outputting it, to thereby locate each of the positions of each of the nearest obstacles. Then, if each of the bottom lines of each of the nearest obstacles is estimated as present in each specific channel with each corresponding highest value among values of the channels per each of the columns by referring to the normalized values, the segmentation result may be generated such that each of the estimated positions of the each of the bottom lines of the nearest obstacles among the rows per each of the columns has each corresponding highest value and the rest of positions among the rows per each of the columns have lower values, among the $N_c$ rows.

To understand this process, one needs to understand the shape of a final result, i.e., a result of the softmax operation. The desired output from the learning method of the CNN may be finding each row with each corresponding highest value among the $N_c$ rows for each of the columns in the input image as the position of the nearest obstacles. In order to do so, $N_c$ scores per column may be required. If the number, i.e., the width of the input image, of the columns in the input image is 640, i.e., 640 pixels or 640 columns, then a score map having a size of $N_c$ (channel)×640(width)×1(height) may be calculated as an output.

The process of generating the score map having a size of $N_c$ (channel)×640(width)×1(height) as the output is as follows. For example, if the first reshaped feature map 161 having a size of 512(64*8) (channel)×40(width)×1(height) of the fifth decoded feature map by the first reshaping process, i.e., RESHAPE 5-1, is generated, this first reshaped feature map may have forty columns, only a sixteenth of those of the input image. Thus, in this case, sixteen $N_c$ output scores generated from sixteen times of the 1×1 convolution operations may suffice. Therefore, the size of the output 162 from CONV_OUT5 in FIG. 3 must be designed to be $(N_c*16)$ (channel)×40(width)×1(height). Then, the second reshaping process, i.e., RESHAPE 5-2, may be needed to convert the score map having a size of $(N_c*16)$ (channel)× 40(width)×1(height) to the scope map having a size of $N_c$ (channel)×640(width)×1(height).

By referring to the example in FIG. 3, the feature map 162 having a size of 40×1 with $N_c*16$ ch may be converted to the feature map 163 having a size of 640×1 with $N_c$ ch by the 1×1 convolution, i.e., CONV_OUT5, and an output 164 is generated such that each of the estimated positions of each of the bottom lines of each of the nearest obstacles among the rows per each of the columns has each corresponding highest value, and that the rest of positions among the rows per each of the columns have lower values, among the $N_c$ rows per each column of 640 by the softmax operation. Then, the feature map 172 having a size of 80×1 with $N_c*8$ ch, the feature map 182 having a size of 160×1 with $N_c*4$ ch, the feature map 192 having a size of 320×1 with $N_c 2$ ch, and the feature map 202 having a size of 640×1 with $N_c$ ch are respectively converted to each of the feature maps 173, 183, 193, and 203 having a size of 640×1 with $N_c$ ch by each of the 1×1 convolution operations of CONV_OUT4 to CONV_OUT1, and then each of outputs 174, 184, 194, and 204 is generated such that each of the estimated positions of each of the bottom lines of the nearest obstacles among the rows per each of the columns has each corresponding highest value, and that the rest of the positions among the rows per each of the columns have lower values, among the $N_c$ rows per each column of 640 by the softmax operation.

That is, the learning device may generate the segmentation result representing each of the estimated positions, in the at least one decoded feature map, where each of the bottom lines of each of the nearest obstacles is estimated as located by checking each of the columns from its corresponding lowest cell therein along the second direction, i.e., upwards. The learning device may generate the segmentation result by checking each of the estimated positions of each of the bottom lines of each of the nearest obstacles on concatenated channels for each of the columns of the reshaped feature map.

By referring to FIG. 2 again, at least one loss may be generated by referring to the segmentation result and its corresponding at least one GT image at a step of S07, and parameters of the CNN may be learned or optimized by backpropagating the loss at a step of S08.

Herein, the GT image may be an image in which each of exact rows is indicated as corresponding to each of GT positions where each nearest obstacle is truly located on each of the columns from its corresponding lowest cell therein along the second direction, i.e., upwards. FIG. 5 is a drawing exemplarily illustrating the input image and its corresponding GT image for detecting the nearest obstacles in accordance with the present invention. By referring to FIG. 5, the GT image may be generated by designating a nearest object as the nearest obstacle when checking from the bottom to the top per each column, i.e., per column acquired by dividing 640 pixels by the first intervals or per each pixel of the 640 pixels, in the input image. Because GT image includes information representing on which row each of the bottom lines of each of the nearest obstacles is truly located among the $N_c$ rows, per each of the columns in the input image, and the segmentation result includes information representing on which row each of the bottom lines of each of the nearest obstacles is estimated as located among the $N_c$ rows, per each of the columns in the input image, all of the reshaped feature maps 164, 174, 184, 194, and 204 from reshaping the decoded feature map may be generated as having the $N_c$ channels.

The loss at the step of S07 may be a cross-entropy loss. The loss may be backpropagated for learning or optimizing the parameters of the CNN. In the example of FIG. 3, outputs are generated by using five coded feature maps and thus five losses are generated, however, the backpropagation may be performed by referring to the loss and the outputs from at least part of the five decoded feature maps. Especially, although it is preferable that the loss be used which is generated by referring to the first decoded feature map outputted from the first convolutional layer 20, it is not a requirement.

On condition that the parameters of the CNN have been learned via the above processes, a testing device using the CNN with the learned parameters may detect nearest obstacles from at least one test image as the input image.

FIG. 6 is a drawing exemplarily illustrating operations on the input image to describe a testing method of the CNN for detecting the nearest obstacles in accordance with the present invention. By referring to FIG. 6, unlike the learning device in FIG. 3, a single output suffices, and the fourth deconvolutional layer to the first deconvolutional layer may be omitted because the output may be directly generated using the fifth decoded feature map. As another example, some of the omitted deconvolutional layers may be included.

Detailed explanation of the processes is similar to the description by referring to FIG. 3, thus detecting the nearest obstacles by referring to FIG. 6 is briefly described as follows. First, the testing device may receive the test image 100 and may instruct the first to the n-th convolutional layers 11 to 15 to respectively and sequentially generate a first encoded feature map for testing to an n-th encoded feature map for testing 110, 120, 130, 140, and 150 from the test image 100. Then, the testing device may instruct at least one deconvolutional layer 16 to generate a decoded feature map 160 for testing from the n-th encoded feature map 150 for testing. Then, a reshaped feature map 161 for testing may be generated by concatenating, in a direction of the channel, each of features of each of the rows per each of the columns arranged in the second direction, by referring to the grid, from the decoded feature map 160 for testing. Then, a feature map 162 for testing with channels changed by the 1×1 convolution operations and additional reshaping processes, and a feature map 163 for testing with its channels changed to $N_c$ and the horizontal number of its columns changed to the horizontal number of the test image are generated. Then, the testing device may generate a segmentation result 164 for testing by checking each of the estimated positions of each of the bottom lines of each of the nearest obstacles among the rows per each of the columns on concatenated channels per each of the columns of the reshaped feature map for testing, to thereby detect the nearest obstacles.

Figure 7A:
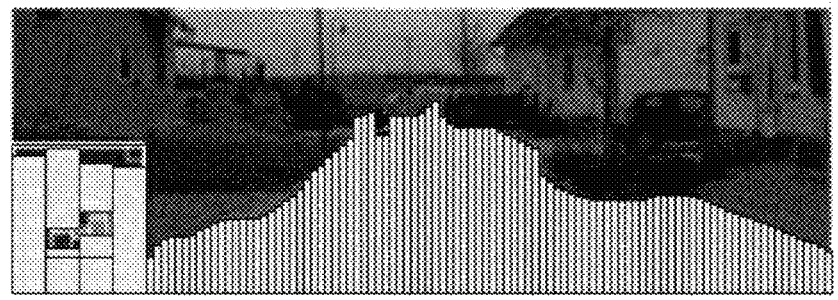
FIG. 7A is a drawing schematically illustrating a result of a conventional object detection.
Figure 7B:
FIGS. 7B and 7C are drawings schematically illustrating a result of object detection in accordance with the present invention.
Figure 7C:

FIG. 7A is a drawing schematically illustrating a result of the conventional object detection. FIGS. 7B and 7C are drawings schematically illustrating the result of the object detection in accordance with the present invention.

FIG. 7A illustrates an example of detecting the nearest obstacles according to the conventional method, which has to check every pixel to determine whether the pixel corresponds to the lane or not, and as a result, its computational load is heavy. However, FIGS. 7B and 7C illustrate the method in accordance with the present invention which detects the nearest obstacles by checking the grid cells of a certain number, e.g., $N_c$, from the bottom to the top of an image to estimate positions where each of the bottom lines of each of the nearest obstacles is located, as indicated in green, and as a result, the nearest obstacles in a high-resolution image are quickly detected with less computation.

Further, the conventional method has a problem that the horizontal resolution of the detection result is lower than the resolution of the input image due to time required for its processing, however, the method in accordance with the present invention resolves this problem because the horizontal resolutions of the input image and the output result are the same.

Additionally, the present invention may utilize high-resolution information when learning by using multi-loss, then in a real-world test, high-resolution outputs are generated using only low-resolution feature maps. Therefore, less computation and quick processing are achieved by outputting high-resolution information from the low-resolution feature maps.

Figure 8:
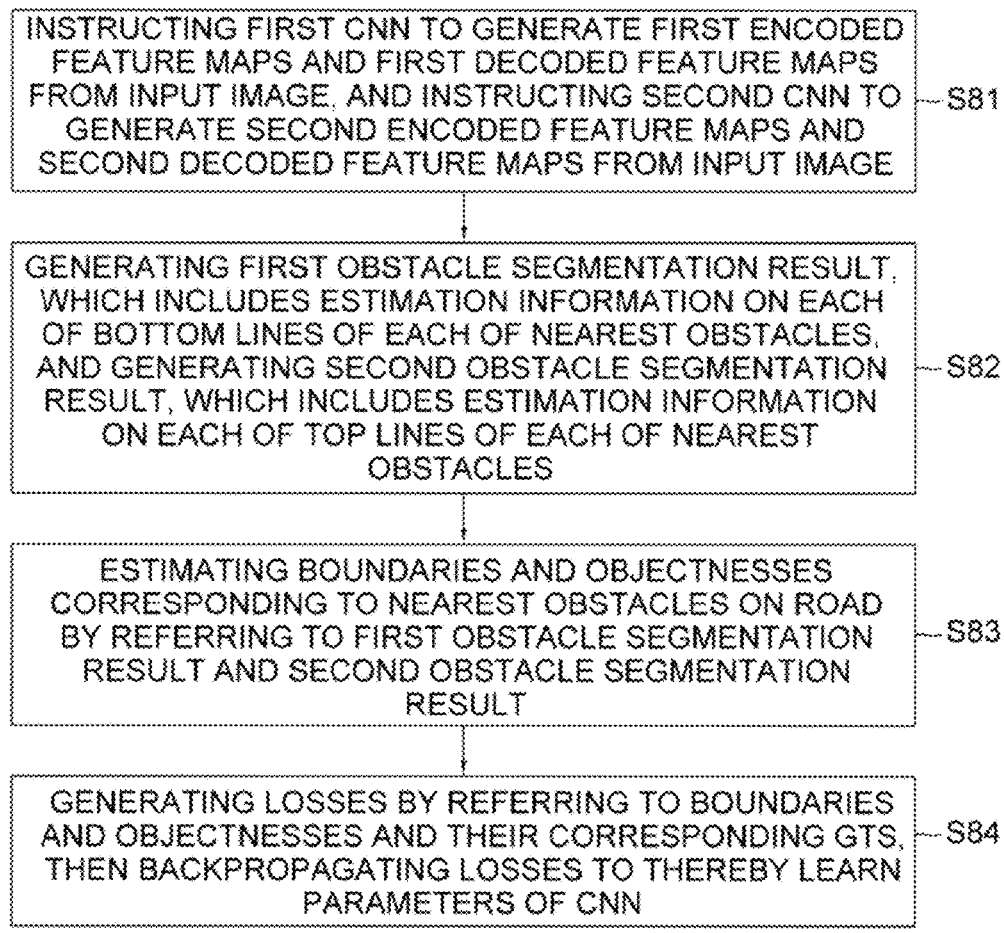
FIG. 8 is a flow chart schematically illustrating a process of detecting one or more boundaries and one or more objectnesses in accordance with the present invention.

FIG. 8 is a flow chart schematically illustrating a process of detecting one or more boundaries and one or more objectnesses in accordance with the present invention.

By referring to FIG. 8, the method for detecting the boundaries of a road and the objectnesses of one or more nearest obstacles on the road using the method for detecting the obstacles aforementioned is described below.

First, by referring to FIG. 8, the learning device may acquire or support another device to acquire the input image as a training image, may instruct a first CNN to generate one or more first encoded feature maps and one or more first decoded feature maps from the input image, and may instruct a second CNN to generate one or more second encoded feature maps and one or more second decoded feature maps from the input image at a step of S81. Herein, the first CNN may be identical to the second CNN, or the first CNN may not be identical to the second CNN.

Figure 9:
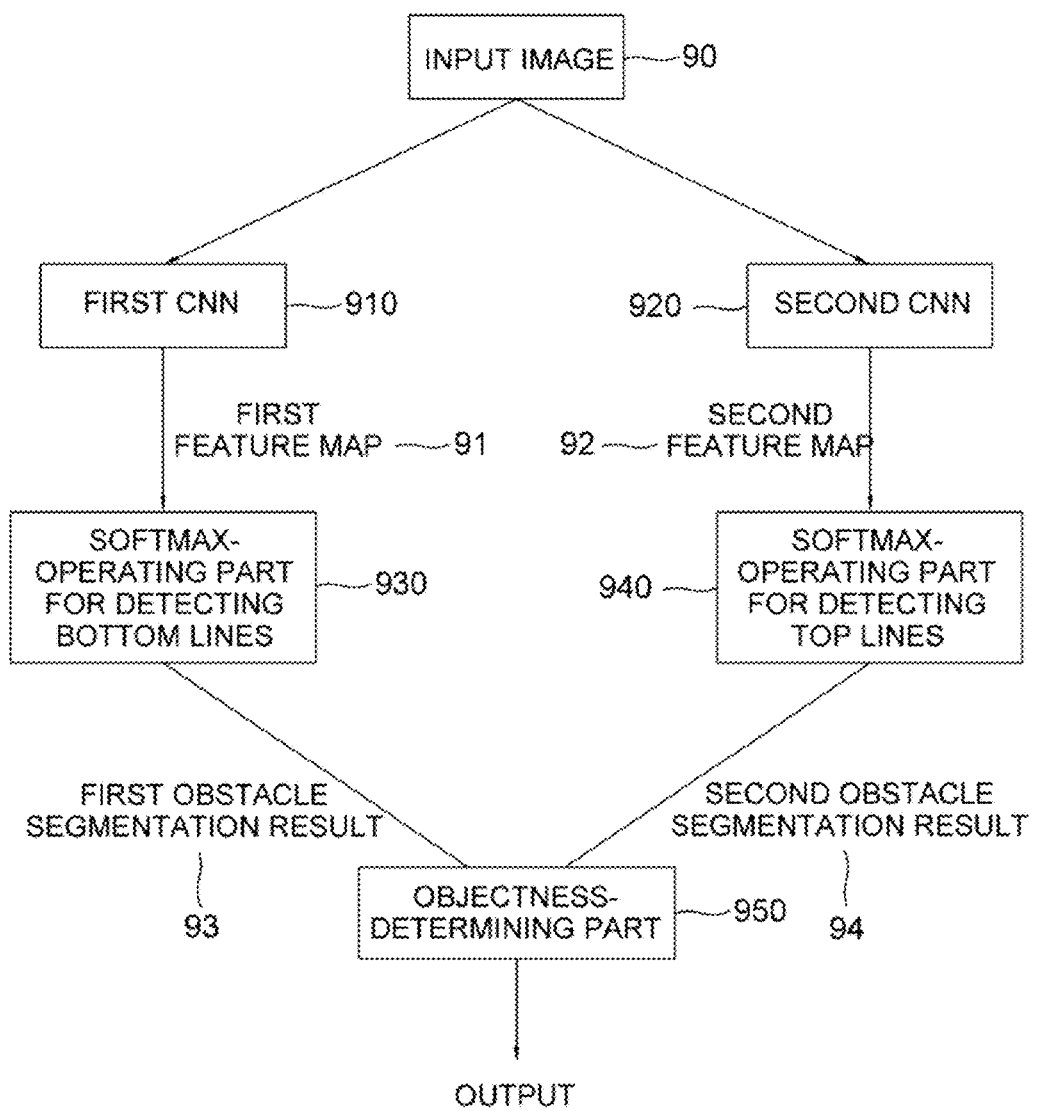
FIG. 9 is a drawing schematically illustrating a configuration of the CNN for detecting the boundaries and the objectnesses in accordance with one example embodiment of the present invention.

FIG. 9 is a drawing schematically illustrating a configuration of the CNN for detecting the boundaries and the objectnesses in accordance with one example embodiment of the present invention.

The obstacles may be any objects, boundaries of the road, or steps, etc. that can be hindrances to vehicles, and the objectnesses may mean presence or existence per se of any objects. For example, detecting an object may mean determining whether the object is an animal or not, but detecting an objectness may mean determining whether the object exists or not.

To describe the step of S81 by referring to FIG. 9, the learning device may acquire the input image 90, may instruct one or more convolutional layers of the first CNN 910 to sequentially generate the first encoded feature maps from the input image 90, and may instruct one or more deconvolutional layers of the first CNN 910 to sequentially generate the first decoded feature maps from the first encoded feature maps. On the other hand, in FIG. 9, an output of the first CNN 910 is represented as a first feature map 91. Also, the learning device may instruct one or more convolutional layers of the second CNN 920 to sequentially generate the second encoded feature maps from the input image 90, and may instruct one or more deconvolutional layers of the second CNN 920 to sequentially generate the second decoded feature maps from the second encoded feature maps. Further, in FIG. 9, an output of the second CNN 920 is represented as a second feature map 92.

By referring to FIG. 8 again, a first obstacle segmentation result, which includes estimation information on each of the bottom lines of each of the nearest obstacles, may be generated from a first softmax operation on at least one specific first decoded feature map among the first decoded feature maps, and second obstacle segmentation result, which includes estimation information on each of top lines of each of the nearest obstacles, may be generated from a second softmax operation on at least one specific second decoded feature map among the second decoded feature maps, at a step of S82.

To describe the present invention by referring to FIG. 9, the step of S82 may be performed by a softmax-operating part 930 for detecting the bottom lines and a softmax-operating part 940 for detecting the top lines of the learning device. First, the learning device may instruct the softmax-operating part 930 to apply the softmax operation to the first feature map 91 for detecting the bottom lines, to thereby generate the first obstacle segmentation result 93. Also, in parallel to the former softmax operation, the learning device may instruct the softmax-operating part 940 to apply the softmax operation to the second feature map 92 for detecting the top lines, to thereby generate the second obstacle segmentation result 94. Specifically, on condition that each cell of a grid with a plurality of rows and a plurality of columns is generated by dividing the first and the second decoded feature maps, with respect to a first direction and a second direction, wherein the first direction is in a direction of the rows of the first and the second decoded feature maps and the second direction is in a direction of the columns thereof, the learning device may generate at least one first obstacle segmentation result 93 representing each of first specific rows, where each of the bottom lines of each of the nearest obstacles is estimated as being located per each of the columns, by referring to at least one feature of at least one specific first decoded feature map 91 among the first decoded feature maps 91. Herein, the first obstacle segmentation result 93 may be generated by the first softmax operation which normalizes each value corresponding to each channel per each of the columns, so that said each value ranges from 0 to 1. Also, the learning device may generate at least one second obstacle segmentation result 94 representing each of second specific rows, where each of the top lines of each of the nearest obstacles is estimated as being located per each of the columns by referring to at least one feature of at least one specific second decoded feature map among the second decoded feature maps 92. Herein, the second obstacle segmentation result 94 may be generated by the second softmax operation which normalizes each value corresponding to each channel per each of the columns, so that said each value ranges from 0 and 1.

At the step of S82, as described by referring to FIGS. 2 to 6, supposing that each cell of the grid is generated by dividing the first and the second decoded feature maps 91 and 92 with respect to the first direction by first intervals and with respect to the second direction by second intervals, and that each of features of each of the rows per each of the columns is concatenated in the direction of the channel to generate at least one first reshaped feature map and at least one second reshaped feature map, the learning device may generate (i) the first obstacle segmentation result 93 which represents each of the first specific rows, where each of the bottom lines of each of the nearest obstacles is estimated as being located per each of the columns, among the rows, by checking each of estimated positions of each of the bottom lines of each of the nearest obstacles on concatenated channels for each of the columns on the first reshaped feature map, where the first obstacle segmentation result 93 is generated by the first softmax operation which normalizes each value corresponding to each channel per each of the columns; and (ii) the second obstacle segmentation result 94 which represents each of the second specific rows, where each of the top lines of each of the nearest obstacles is estimated as being located per each of the columns, among the rows, by checking each of estimated positions of each of the top lines of each of the nearest obstacles starting upward from each of the bottom lines on concatenated channels for each of the columns on the second reshaped feature map, where the second obstacle segmentation result 94 is generated by the second softmax operation which normalizes each value corresponding to each channel per each of the columns.

By referring to FIG. 8 again, the learning device may estimate the boundaries and the objectnesses corresponding to the nearest obstacles on the road by referring to the first obstacle segmentation result 93 and the second obstacle segmentation result 94, at a step of S83. The step of S83 may be performed by an objectness-determining part 950 of the learning device in FIG. 9. In this case, the learning device may estimate the objectnesses corresponding to the nearest obstacles on the road by referring to the first obstacle segmentation result 93 and the second obstacle segmentation result 94, but may skip estimation of the boundaries as the case may be.

Herein, if each difference of each distance between (i) each of the first specific rows where each of the bottom lines of each of the nearest obstacles is estimated as being located per each of the columns and (ii) each of the second specific rows where each of the top lines of each of the nearest obstacles is estimated as being located per each of the columns is detected as less than a predetermined threshold by referring to the first obstacle segmentation result 93 and the second obstacle segmentation result 94, the learning device may determine that each of the boundaries are present in the input image. And if each difference of each distance between (i) each of the first specific rows per each of the columns and ii) each of the second specific rows per each of the columns is detected as larger than the predetermined threshold, the learning deice may determine that each of the objectnesses corresponding to each of the nearest obstacles is present on the road in the input image.

Figure 11:
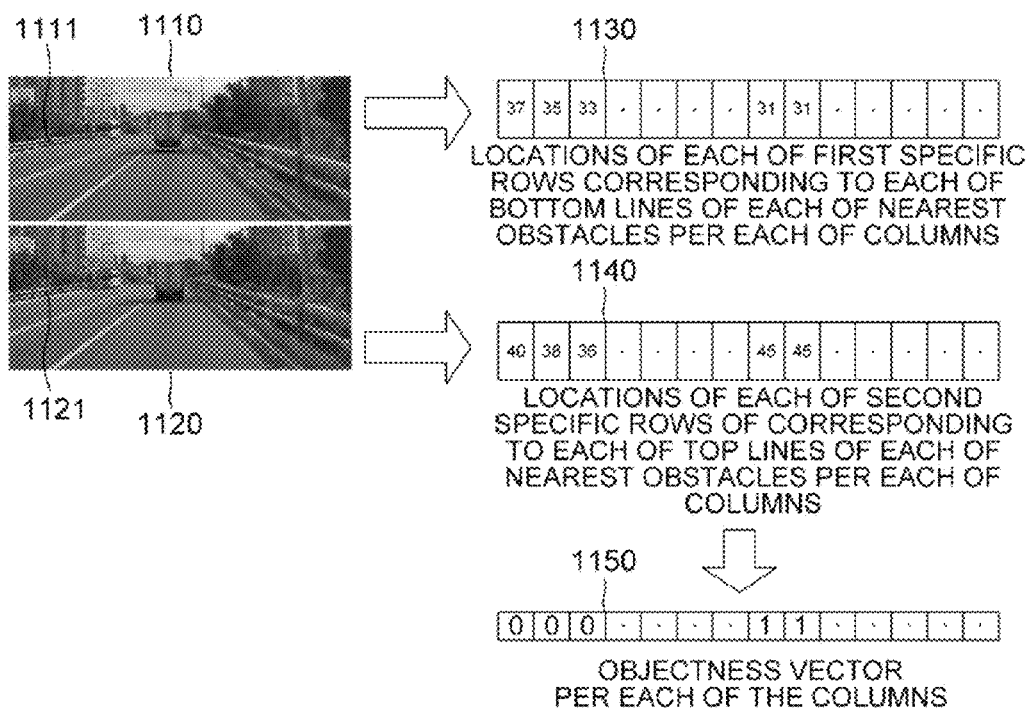
FIG. 11 is a drawing schematically illustrating a process of estimating the boundaries and the objectnesses by referring to estimation of bottom lines and top lines of the obstacles.

FIG. 11 is a drawing schematically illustrating a process of estimating the boundaries and the objectnesses by referring to estimation of the bottom lines and the top lines of the obstacles.

By referring to FIG. 11, an integrated bottom line 1111 may be determined by connecting each of the bottom lines of each of the obstacles per each column of the first obstacle segmentation result 1110, and an integrated top line 1121 may be determined by connecting each of the top lines of each of the obstacles per each column of the second obstacle segmentation result 1120.

Herein, one or more GTs (Ground Truths) may include information representing on which row each of the bottom lines and each of the top lines of each of the nearest obstacles are truly located among the rows, per each of the columns, on condition that the input image is divided into $N_c$ rows, e.g., 80, along the second direction, and the first and the second softmax operations 93 and 94 may include information representing on which row each of the bottom lines and each of the top lines of each of the nearest obstacles are estimated as being located among the rows, per each of the columns, on condition that the input image is divided into the $N_c$ rows.

In case the second direction of the input image is divided into 80 rows as in an example in FIG. 11, locations of each of the first specific rows corresponding to each of the bottom lines of each of the nearest obstacles per each of the columns are shown as in a table 1130, and locations of the second specific rows of each of the top lines of each of the nearest obstacles per each of the columns are shown as in a table 1140. By referring to the table 1130, each of the bottom lines of each of the nearest obstacles is estimated as being on the rows 37, 35, 33, . . . , 31, 31, . . . , from the bottom per each column of the input image among the 80 rows in total. These may result in the integrated bottom line 1111 of the first obstacle segmentation result 1110. And by referring to the table 1140, each of the top lines of each of the nearest obstacles is estimated as being on the rows 40, 38, 36, . . . , 45, 45, . . . , from the bottom per each column of the input image among the 80 rows in total. These may comprise the integrated top line 1121 of the second obstacle segmentation result 1120.

Then, if each of respective differences between each location of the first specific rows of each of the bottom lines in the table 1130 and each location of the second specific rows of each of the top lines in the table 1140 is determined as larger than a certain threshold, the objectness may be determined as detected and its corresponding element in an objectness vector 1150 per each of the columns may be indicated as 1, but if each of the respective differences is determined as smaller than the certain threshold, the objectness may be determined as not detected and its corresponding element in the objectness vector 1150 per each of the columns may be indicated as 0, and as a result, the objectness vector 1150 per each column may be generated. That is, one parts of the objectness vector 1150 indicated as 0 may be determined as where only the boundaries of the road are present, among the obstacles on the road, and the other parts of the objectness vector 1150 indicated as 1 may be determined as where the objectnesses of the obstacles on the road are present.

Figure 12:
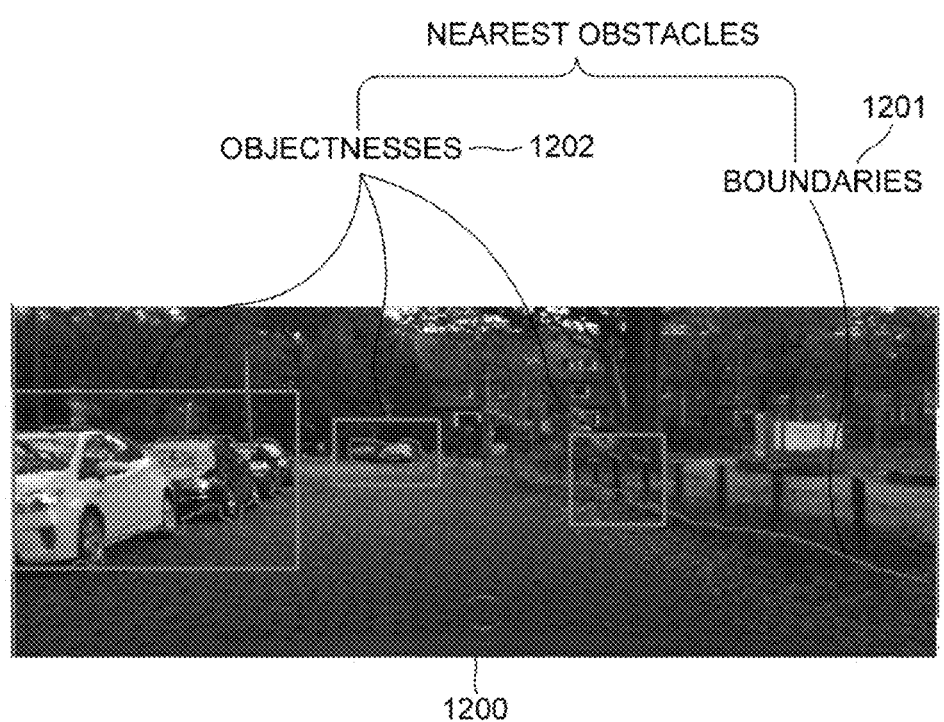
FIG. 12 is a drawing schematically illustrating an example of detecting the obstacles including the boundaries and the objectnesses in the input image acquired in accordance with the present invention.

FIG. 12 is a drawing schematically illustrating an example of detecting the nearest obstacles including the boundaries and the objectnesses in the input image acquired in accordance with the present invention.

A result 1200 of detecting the nearest obstacles is shown in FIG. 12, where the learning device may estimate the boundaries 1201 of the road and the objectnesses 1202 corresponding to the nearest obstacles on the road by referring to the first obstacle segmentation result and the second obstacle segmentation result. As in the example of FIG. 12, by referring to the first obstacle segmentation result and the second obstacle segmentation result, if each of respective differences, per each of the columns, between each location of the first specific rows of each of the bottom lines and each location of the second specific rows of each of the top lines is determined as less than the certain threshold, then only the boundaries 1201 of the road may be determined as present, but if a row with much different values in each column is detected, then each of the objectnesses 1202 may be determined as present between the row resulting from the first obstacle segmentation result and the row resulting from the second obstacle segmentation result. That is, although the estimated objectnesses 1202 is unidentified, the presence of some objects is known which may interfere with the vehicles. Additionally, the boundaries 1201 of an inoperable road may also be detected By referring to FIG. 8 again, one or more losses may be generated by referring to the boundaries and the objectnesses and their corresponding GTs, then the losses may be backpropagated to thereby learn the parameters of the CNN at a step of S84. Herein, the GTs may include information on locations of first exact rows where each of the bottom lines of each of the nearest obstacles is truly positioned per each of the columns and on locations of second exact rows where each of the top lines of each of the nearest obstacles is truly positioned per each of the columns.

Figure 10:
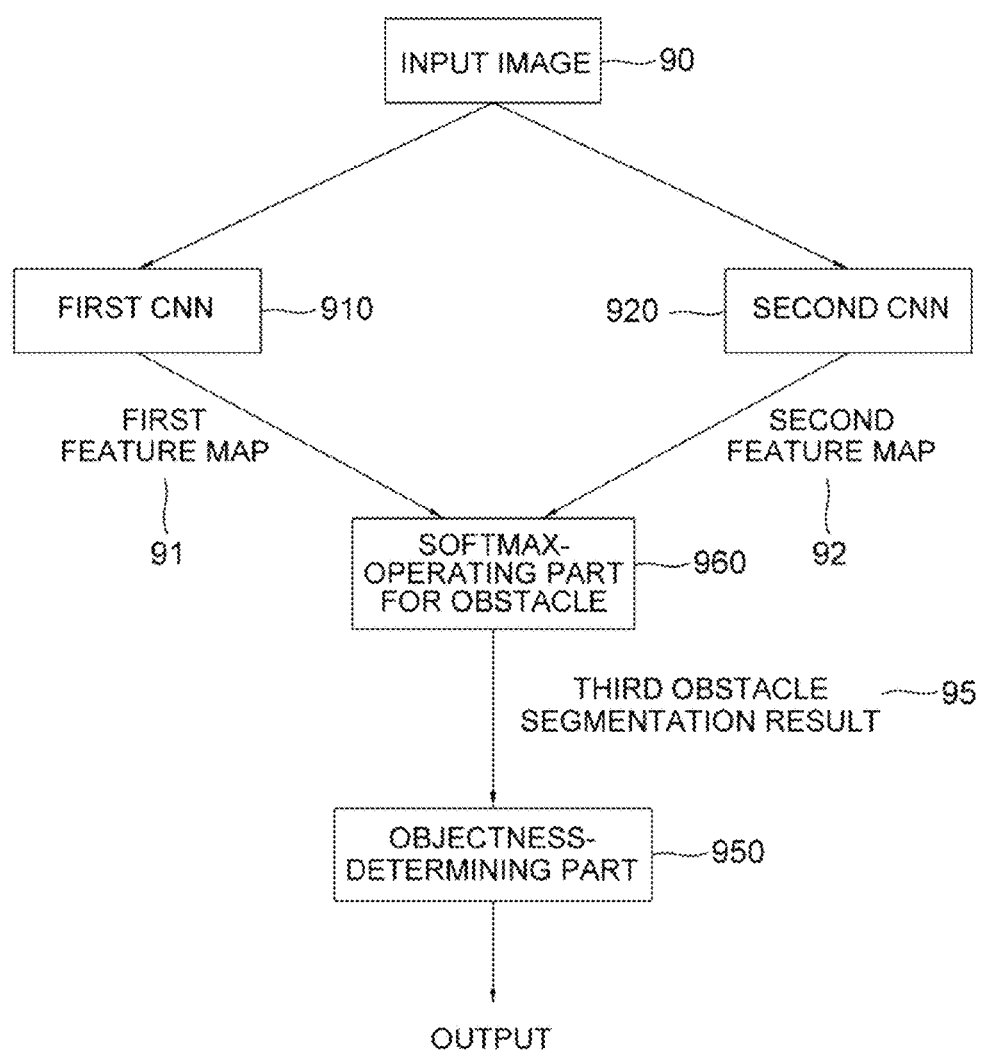
FIG. 10 is a drawing schematically illustrating a configuration of the CNN for detecting the boundaries and the objectnesses in accordance with another example embodiment of the present invention.

FIG. 10 is a drawing schematically illustrating a configuration of the CNN for detecting the boundaries and the objectnesses in accordance with another example embodiment of the present invention.

In FIG. 10, the first obstacle segmentation result from the first softmax operation and the second obstacle segmentation result from the second softmax operation are not generated explicitly. Instead, a third obstacle segmentation result 95 may be generated such that the third obstacle segmentation result 95 includes information on each of the bottom lines and each of the top lines estimated as being positioned respectively in two rows with top two highest values for each of the columns of concatenated features, where the concatenated features are generated by using features of the first and the second decoded feature maps 91 and 92. These processes, may be performed by a softmax-operating part 960 for obstacle in FIG. 10, and the third obstacle segmentation 95 result may be generated by a third softmax operation which normalizes each value corresponding to each of the rows per each of the columns of the concatenated features, where the concatenated features are generated by using features of the first and the second decoded feature maps 91 and 92.

On the other hand, the learning method described by referring to FIGS. 8 to 12 may apply to the testing method.

That is, the testing method using the CNN capable of identifying the objectnesses by detecting the bottom lines and the top lines of the nearest obstacles in the input image as a test image may include steps of (a) the testing device acquiring the test image, on condition that the learning device has performed processes of (i) (i-1) acquiring the input image as the training image, instructing the convolutional layers of the first CNN to sequentially generate one or more first encoded feature maps for training from the input image, and instructing the deconvolutional layers of the first CNN to sequentially generate one or more first decoded feature maps for training from the first encoded feature maps for training, and (i-2) instructing the convolutional layers of the second CNN to sequentially generate one or more second encoded feature maps for training from the input image, and instructing the deconvolutional layers of the second CNN to sequentially generate one or more second decoded feature maps for training from the second encoded feature maps for training, (ii) if each cell of a grid with a plurality of rows and a plurality of columns is generated by dividing the first and the second decoded feature maps for training, with respect to a first direction and a second direction, wherein the first direction is in a direction of the rows of the first and the second decoded feature maps for training and the second direction is in a direction of the columns thereof, (ii-1) generating at least one first obstacle segmentation result for training representing where each of the bottom lines of each of nearest obstacles is estimated as located per each of the columns by referring to at least one feature of at least one specific first decoded feature map for training among the first decoded feature maps for training, (ii-2) generating at least one second obstacle segmentation result for training representing where each of the to lines of each of the nearest obstacles is estimated as located per each of the columns by referring to at least one feature of at least one specific second decoded feature map for training among the second decoded feature maps for training, (iii) estimating one or more objectnesses for training corresponding to the nearest obstacles on a road by referring to the first obstacle segmentation result for training and the second obstacle segmentation result for training, (iv) calculating one or more losses by referring to the objectnesses for training and their corresponding GTs wherein each of the GTs includes information on locations of first exact rows where each of the bottom lines of each of the nearest obstacles is truly positioned per each of the columns and on locations of second exact rows where each of the top lines of each of the nearest obstacles truly positioned per each of the columns, and (v) backpropagating the losses, to thereby learn the parameters of the CNN; (b) the testing device instructing the convolutional layers of the first CNN to sequentially generate one or more first encoded feature maps for testing from the test image, and instructing the deconvolutional layers of the first CNN sequentially generate one or more first decoded feature maps for testing from the first encoded feature maps for testing, and (ii) instructing the convolutional layers of the second CNN to sequentially generate one or more second encoded feature maps for testing from the test image, and instructing the deconvolutional layers of the second CNN to sequentially generate one or more second decoded feature maps for testing from the second encoded feature maps for testing; (c) the testing devices, on condition that each cell of a grid with a plurality of rows and a plurality of columns is generated by dividing the first and the second decoded feature maps for testing, with respect to the first direction and the second direction, where the first direction is in the direction of the rows of the first and the second decoded feature maps for testing and the second direction is in the direction of the columns thereof, (i) generating at least one first obstacle segmentation result for testing representing where each of the bottom lines of each of the nearest obstacles is estimated as being located per each of the columns by referring to at least one feature of at least one specific first decoded feature map for testing among the first decoded feature maps for testing, (ii) generating at least one second obstacle segmentation result for testing representing where each of the top lines of each of the nearest obstacles is estimated as being located per each of the columns by referring to at least one feature of at least one specific second decoded feature map for testing among the second decoded feature maps for testing; and (d) the testing device estimating one or more objectnesses for testing corresponding to the nearest obstacles on the road by referring to the first obstacle segmentation result for testing and the second obstacle segmentation result for testing. Herein, at the step of (d), the testing device may further estimate the boundaries of the road by referring to the first obstacle segmentation result for testing and the second obstacle segmentation result for testing.

In a conventional learning method for detecting the objects, learning had to be performed for every object for its detection. For example, the vehicles on the road are detected only after learning to recognize the vehicles has been performed, and if a need for human recognition arises later, learning to recognize the human had to be performed. Further, these object detection required heavy computation. However, the method in accordance with the present invention detects the objectnesses of the obstacles on the road, therefore, regardless of whether the objectnesses correspond to vehicles or pedestrians, the obstacles are detected. As a result, the method in accordance with the present invention does not require learning of each and every object, and detects the objectnesses of the obstacles and the boundaries with less computation.

As can be understood by those skilled in the art, it is clear that communication parts of the learning device and the testing device may perform transmission of image data, for example, images described above like the training image, the test image, and the input image, etc., and that processors and/or memories of the learning device and the testing device may retain data for feature maps and performing operations, and that the processors of the learning device and the testing device may perform convolution operations, deconvolution operations, and loss value operations, but the scope of the present invention is not limited thereto.

The present invention has an effect of determining appropriate paths for the autonomous vehicles by detecting where the nearest obstacles are positioned per each of the columns of the grid.

The present invention has another effect of detecting the nearest obstacles with less computation, without checking every pixel in the input image.

The present invention has still another effect of providing the method for detecting boundaries of the road and objectnesses of the nearest obstacles on the road with less computation.

The embodiments of the present invention as explained above can he implemented in a form of executable program command through a variety of computer means recordable to computer readable media. The computer readable media may include solely or in combination, program commands, data files, and data structures. The program commands recorded to the media may be components specially designed for the present invention or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a computer but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. They have been provided only to help more general understanding of the present invention. It, however, will be understood by those skilled in the art that various changes and modification may be made from the description without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for learning parameters of CNNs capable of identifying one or more objectnesses by detecting one or more bottom lines and one or more top lines of one or more nearest obstacles in at least one input image, comprising steps of:
 (a) a learning device, if the input image is acquired as a training image, (i) instructing one or more convolutional layers of a first CNN to sequentially generate one or more first encoded feature maps from the input image, and instructing one or more deconvolutional layers of the first CNN to sequentially generate one or more first decoded feature maps from the first encoded feature maps, and (ii) instructing one or more convolutional layers of a second CNN to sequentially generate one or more second encoded feature maps from the input image, and instructing one or more deconvolutional layers of the second CNN to sequentially generate one or more second decoded feature maps from the second encoded feature maps;
(b) the learning device, on condition that each cell of a grid with a plurality of rows and a plurality of columns is generated by dividing the first and the second decoded feature maps, with respect to a first direction and a second direction, wherein the first direction is in a direction of the rows of the first and the second decoded feature maps and the second direction in a direction of the columns thereof, (i) generating at least one first obstacle segmentation result representing each of first specific rows, where each of the bottom lines of each of the nearest obstacles is estimated as being located per each of the columns, by referring to at least one feature of at least one specific first decoded feature map among the first decoded feature maps, and (ii) generating at least one second obstacle segmentation result representing each of second specific rows, where each of the top lines of each of the nearest obstacles is estimated as being located per each of the columns, by referring to at least one feature of at least one specific second decoded feature map among the second decoded feature maps;
(c) the learning device estimating the objectnesses corresponding to the nearest obstacles on a road by referring to the first obstacle segmentation result and the second obstacle segmentation result;
(d) the learning device generating one or more losses by referring to the objectnesses and their corresponding GTs wherein each of the GTs includes information on locations of first exact rows where each of the bottom lines of the nearest obstacles is truly positioned per each of the columns, and on locations of second exact rows where each of the top lines of the nearest obstacles is truly positioned per each of the columns; and
(f) the learning device backpropagating the losses, to thereby learn the parameters of the CNN.

2. The method of claim 1, wherein, at the step of (c), the learning device further estimates one or more boundaries of the road by referring to the first obstacle segmentation result and the second obstacle segmentation result, and
wherein, at the step of (d), the learning device generates the losses by referring the boundaries, the objectnesses, their corresponding GTs.

3. The method of claim 2, wherein, at the step of (c), if each difference of each distance between (i) each of the first specific rows where each of the bottom lines of each of the obstacles is estimated as located per each of the columns and (ii) each of the second specific rows where each of the top lines of each of the obstacles is estimated as located per each of the columns is detected as less than a predetermined threshold by referring to the first obstacle segmentation result and the second obstacle segmentation result, the learning device determines that the boundaries are present in the input image, and
wherein if each difference of each distance between (i) each of the first specific rows per each of the columns and (ii) each of the second specific rows per each of the columns is detected as larger than the predetermined threshold, the learning device determines that the objectnesses corresponding to the nearest obstacles are present on the road in the input image.

4. The method of claim 1, wherein the step of (b) includes steps of:

(b1) the learning device, supposing that each cell of the grid is generated by dividing the first and the second decoded feature maps with respect to the first direction by first intervals and with respect to the second direction by second intervals, concatenating each of features of each of the rows per each of the columns in a direction of a channel, to thereby generate at least one first reshaped feature map and at least one second reshaped feature map; and
(b2) the learning device (i) generating the first obstacle segmentation result by checking each of estimated positions of each of the bottom lines of each of the obstacles on concatenated channels for each of the columns on the first reshaped feature map, wherein the first obstacle segmentation result generated by a first softmax operation which normalizes each value corresponding to each channel per each of the columns, and (ii) generating the second obstacle segmentation result by checking each of estimated positions of each of the top lines of each of the obstacles starting upward from each of the bottom lines on concatenated channels for each of the columns on the second reshaped feature map, wherein the second obstacle segmentation result is generated by a second softmax operation which normalizes each value corresponding to each channel per each of the columns.

5. The method of claim 1, wherein each of the columns includes one or more pixels in the first direction, and each of the rows includes one or more pixels in the second direction.

6. The method of claim 1, wherein the GTs include information representing on which row each of the bottom lines and each of the top lines of each of the nearest obstacles are truly located among the rows, per each of the columns, resulting from dividing the input image into $N_c$ rows, and wherein the first obstacle segmentation result and the second obstacle segmentation result include information representing on which row each of the bottom lines and each of the top lines of each of the obstacles are estimated as located among the rows, per each of the columns, resulting from dividing the input image into $N_c$ rows.

7. The method of claim 1, wherein, at the step of (b), a third obstacle segmentation result is generated such that the third obstacle segmentation result includes information on the first and the second specific rows with top two highest values for each of the columns of concatenated features, wherein the concatenated features are generated by using features of the first and the second decoded feature maps, and wherein the third obstacle segmentation result is generated by a third softmax operation which normalizes each value corresponding to each of the rows per each of the columns of the concatenated features.

8. A method for testing CNNs capable of identifying one or more objectnesses for training by detecting one or more bottom lines and one or more top lines of one or more nearest obstacles for testing in at least one test image, comprising steps of:
(a) a testing device acquiring the test image, on condition that a learning device has performed processes of (i) instructing one or more convolutional layers of a first CNN to sequentially generate one or more first encoded feature maps for training from at least one input image acquired as a training image, and instructing one or more deconvolutional layers of the first CNN to sequentially generate one or more first decoded feature maps for training from the first encoded feature maps for training, and instructing one or more convolutional layers of a second CNN to sequentially generate one or more second encoded feature maps for training from the input image, and instructing one or more deconvolutional layers of the second CNN to sequentially generate one or more second decoded feature maps for training from the second encoded feature maps for training, (ii) assuming that each cell of a grid with a plurality of rows and a plurality of columns is generated by dividing the first and the second decoded feature maps for training, with respect to a first direction and a second direction, wherein the first direction is in a direction of the rows of the first and the second decoded feature maps for training and the second direction is in a direction of the columns thereof, generating at least one first obstacle segmentation result for training representing each of first specific rows for training, where each of the bottom lines of each of one more nearest obstacles for training is estimated as being located per each of the columns, by referring to at least one feature for training of at least one specific first decoded feature map for training among the first decoded feature maps for training, and generating at least one second obstacle segmentation result for training representing each of second specific rows for training, where each of the top lines of each of the nearest obstacles for training is estimated as being located per each of the columns, by referring to at least one feature for training of at least one specific second decoded feature map for training among the second decoded feature maps for training, (iii) estimating the objectnesses for training corresponding to the nearest obstacles for training on a road by referring to the first obstacle segmentation result for training and the second obstacle segmentation result for training, (iv) generating one or more losses by referring to the objectnesses for training and their corresponding GTs wherein each of the GTs includes information on locations of first exact rows where each of the bottom lines of the nearest obstacles for training is truly positioned per each of the columns, and on locations of second exact rows where each of the top lines of the nearest obstacles for training is truly positioned per each of the columns, and (v) backpropagating the losses, to thereby learn the parameters of the CNNs;

(b) the testing device (i) instructing the convolutional layers of the first CNN to sequentially generate one or more first encoded feature. maps for testing from the test image, and instructing the deconvolutional layers of the first CNN to sequentially generate one or more first decoded feature maps for testing from the first encoded feature maps for testing, and (ii) instructing the convolutional layers of the second CNN to sequentially generate one or more second encoded feature maps for testing from the test image, and instructing the deconvolutional layers of the second CNN to sequentially generate one or more second decoded feature maps for testing from the second encoded feature maps for testing;

(c) the testing device, assuming that each cell of a grid with a plurality of rows and a plurality of columns is generated by dividing the first and the second decoded feature maps for testing, with respect to a first direction and a second direction, wherein the first direction is in a direction of the rows of the first and the second decoded feature maps for testing and the second direction is in a direction of the columns thereof, (i) generating at least one first obstacle segmentation result for testing representing each of first specific rows for testing, where each of the bottom lines of each of the nearest obstacles for testing is estimated as being located per each of the columns, by referring to at least one feature for testing of at least one specific first decoded feature map for testing among the first decoded feature maps for testing, and (ii) generating at least one second obstacle segmentation result for testing representing each of second specific rows for testing, where each of the top lines of each of the nearest obstacles for testing is estimated as being located per each of the columns, by referring to at least one feature for testing of at least one specific second decoded feature map for testing among the second decoded feature maps for testing; and (d) the testing device estimating the objectnesses for testing corresponding to the nearest obstacles for testing on a road by referring to the first obstacle segmentation result for testing and the second obstacle segmentation result for testing.

9. The method of claim 8, wherein, at the step of (d), the testing device further estimates one or more boundaries for testing of the road by referring to the first obstacle segmentation result for testing and the second obstacle segmentation result for testing, and
wherein, at the process of (iv), the learning device has generated the losses by referring to one or more boundaries for training, the objectnesses for training, and their corresponding GTs.

10. The method of claim 9, wherein, at the step of (d), if each difference of each distance between (i) each of the first specific rows for testing where each of the bottom lines of each of the obstacles for testing is estimated as located per each of the columns and (ii) each of the second specific rows for testing where each of the top lines of each of the obstacles for testing is estimated as located per each of the columns is detected as less than a predetermined threshold by referring to the first obstacle segmentation result for testing and the second obstacle segmentation result for testing, the testing device determines that the boundaries for testing are present in the test image, and
wherein, if each difference of each distance between (i) each of the first specific rows for testing per each of the columns and (ii) each of the second specific rows for testing per each of the columns is detected as larger than the predetermined threshold, the testing device determines that the objectnesses for testing corresponding to the nearest obstacles for testing are present on the road in the test image.

11. The method of claim 8, wherein the step of (c) includes steps of:
(c1) the testing device, supposing that each cell of the grid is generated by the first and the second decoded feature maps for testing with respect to the first direction by first intervals and with respect the second direction by second intervals, concatenating each of features for testing of each of the rows per each of the columns in a direction of a channel, to thereby generate at least one first reshaped feature map for testing and at least one second reshaped feature map for testing; and
(c2) the testing device (i) generating the first obstacle segmentation result for testing by checking each of estimated positions of each of the bottom lines of each of the obstacles for testing on concatenated channels for each of the columns on the first reshaped feature map for testing, wherein the first obstacle segmentation result for testing is generated by a first softmax operation which normalizes each value corresponding to each channel per each of the columns, and (ii) generating the second obstacle segmentation result for testing by checking each of estimated positions of each of the top lines of each of the obstacles for testing starting upward from each of the bottom lines on concatenated channels for each of the columns on the second reshaped feature map for testing, wherein the second obstacle segmentation result for testing is generated by a second softmax operation which normalizes each value corresponding to each channel per each of the columns.

12. The method of claim 8, wherein each of the columns includes one or more pixels in the first direction, and each of the rows includes one or more pixels in the second direction.

13. The method of claim 8, wherein the GTs include information representing on which row each of the bottom lines and each of the top lines of each of the nearest obstacles for training are truly located among the rows, per each of the columns, resulting from dividing the input image into $N_c$ rows, and
wherein the first obstacle segmentation result for testing and the second obstacle segmentation result for testing include information representing on which row each of the bottom lines and each of the top lines of each of the obstacles for testing are estimated as located among the rows, per each of the columns, resulting from dividing the test image into $N_c$ rows.

14. The method of claim 8, wherein, at the step of (c), a third obstacle segmentation result for testing generated such that the third obstacle segmentation result for testing includes information on the first and the second specific rows for testing with top two highest values for each of the columns of concatenated features for testing, wherein the concatenated features for testing are generated by using features for testing of the first and the second decoded feature maps for testing, and wherein the third obstacle segmentation result for testing is generated by a third softmax operation which normalizes each value corresponding to each of the rows per each of the columns of the concatenated features for testing.

15. A learning device for learning parameters of CNNs capable of identifying one or more objectnesses by detecting one or more bottom lines and one or more top lines of one or more nearest obstacles in at least one input image, comprising:
a communication part for acquiring the input image as a training image; and
a processor for performing processes of (I) (i) instructing one or more convolutional layers of a first CNN to sequentially generate one or more first encoded feature maps from the input image, and instructing one or more deconvolutional layers of the first CNN to sequentially generate one or more first decoded feature maps from the first encoded feature maps, and (ii) instructing one or more convolutional layers of a second CNN to sequentially generate one or more second encoded feature maps from the input image, and instructing one or more deconvolutional layers of the second CNN to sequentially generate one or more second decoded feature maps from the second encoded feature maps, (II) on condition that each cell of a grid with a plurality of rows and a plurality of columns is generated by dividing the first and the second decoded feature maps, with respect to a first direction and a second direction, wherein the first direction is in a direction of the rows of the first and the second decoded feature maps and the second direction is in a direction of the columns thereof, (i) generating at least one first obstacle segmentation result representing each of first specific rows, where each of the bottom lines of each of the nearest obstacles is estimated as being located per each of the columns, by referring to at least one feature of at least one specific first decoded feature map among the first decoded feature maps, and (ii) generating at least one second obstacle segmentation result representing each of second specific rows, where each of the top lines of each of the nearest obstacles is estimated as being located per each of the columns, by referring to at least one feature of at least one specific second decoded feature map among the second decoded feature maps, (III) estimating the objectnesses corresponding to the nearest obstacles on a road by referring to the first obstacle segmentation result and the second obstacle segmentation result, (IV) generating one or more losses by referring to the objectnesses and their corresponding GTs wherein each of the GTs includes information on locations of first exact rows where each of the bottom lines of the nearest obstacles is truly positioned per each of the columns, and on locations of second exact rows where each of the top lines of the nearest obstacles is truly positioned per each of the columns, and (V) backpropagating the losses, to thereby learn the parameters of the CNN.

16. The learning device of claim 15, wherein, at the process of (III), the processor further estimates one or more boundaries of the road by referring to the first obstacle segmentation result and the second obstacle segmentation result, and
wherein, at the process of (IV), the processor generates the losses by referring to the boundaries, the objectnesses, and their corresponding GTs.

17. The learning device of claim 16, wherein, at the process of (III), if each difference of each distance between (i) each of the first specific rows where each of the bottom lines of each of the obstacles is estimated as located per each of the columns and (ii) each of the second specific rows where each of the top lines of each of the obstacles is estimated as located per each of the columns is detected as less than a predetermined threshold by referring to the first obstacle segmentation result and the second obstacle segmentation result, the processor determines that the boundaries are present in the input image, and
wherein, if each difference of each distance between (i) each of the first specific rows per each of the columns and (ii) each of the second specific rows per each of the columns is detected as larger than the predetermined threshold, the processor determines that the objectnesses corresponding to the nearest obstacles are present on the road in the input image.

18. The learning device of claim 15, wherein the process of (II) includes processes of:
(II-1) supposing that each cell of the grid is generated by dividing the first and the second decoded feature maps with respect to the first direction by first intervals and with respect to the second direction by second intervals, concatenating each of features of each of the rows per each of the columns in a direction of a channel, to thereby generate at least one first reshaped feature map and at least one second reshaped feature map; and
(II-2) (i) generating the first obstacle segmentation result by checking each of estimated positions of each of the bottom lines of each of the obstacles on concatenated channels for each of the columns on the first reshaped feature map, wherein the first obstacle segmentation result is generated by a first softmax operation which normalizes each value corresponding to each channel per each of the columns, and (ii) generating the second obstacle segmentation result by checking each of estimated positions of each of the top lines of each of the obstacles starting upward from each of the bottom lines on concatenated channels for each of the columns on the second reshaped feature map, wherein the second obstacle segmentation result is generated by a second softmax operation which normalizes each value corresponding to each channel per each of the columns.

19. The learning device of claim 15, wherein each of the columns includes one or more pixels in the first direction, and each of the rows includes one or more pixels in the second direction.

20. The learning device of claim 15, wherein the GTs include information representing on which row each of the bottom lines and each of the top lines of each of the nearest obstacles are truly located among the rows, per each of the columns, resulting from dividing the input image into $N_c$ rows, and wherein the first obstacle segmentation result and the second obstacle segmentation result include information representing on which row each of the bottom lines and each of the top lines of each of the obstacles are estimated as located among the rows, per each of the columns, resulting from dividing the input image into $N_c$ rows.

21. The learning device of claim 15, wherein, at the process of (II), a third obstacle segmentation result is generated such that the third obstacle segmentation result includes information on the first and the second specific rows with top two highest values for each of the columns of concatenated features, wherein the concatenated features are generated by using features of the first and the second decoded feature maps, and wherein the third obstacle segmentation result is generated by a third softmax operation which normalizes each value corresponding to each of the rows per each of the columns of the concatenated features.

22. A testing device for testing CNNs capable of identifying one or more objectnesses for training by detecting one or more bottom lines and one or more top lines of one or more nearest obstacles for testing in at least one test image, comprising:

a communication part for acquiring the test image, on condition that a learning device has performed processes of (1) instructing one or more convolutional layers of a first CNN to sequentially generate one or more first encoded feature maps for training from at least one input image acquired as a training image, and instructing one or more deconvolutional layers of the first CNN to sequentially generate one or more first decoded feature maps for training from the first encoded feature maps for training, and instructing one or more convolutional layers of a second CNN to sequentially generate one or more second encoded feature maps for training from the input image, and instructing one or more deconvolutional layers of the second CNN to sequentially generate one or more second decoded feature maps for training from the second encoded feature maps for training, (2) assuming that each cell of a grid with a plurality of rows and a plurality of columns is generated by dividing the first and the second decoded feature maps for training, with respect to a first direction and a second direction, wherein the first direction is in a direction of the rows of the first and the second decoded feature maps for training and the second direction is in a direction of the columns thereof, generating at least one first obstacle segmentation result for training representing each of first specific rows for training, where each of the bottom lines of each of one or more nearest obstacles for training is estimated as being located per each of the columns, by referring to at least one feature for training of at least one specific first decoded feature map for training among the first decoded feature maps for training, and generating at least one second obstacle segmentation result for training representing each of second specific rows for training, where each of the top lines of each of the nearest obstacles for training is estimated as being located per each of the columns, by referring to at least one feature for training of at least one specific second decoded feature map for training among the second decoded feature maps for training, (3) estimating the objectnesses for training corresponding to the nearest obstacles for training on a road by referring to the first obstacle segmentation result for training and the second obstacle segmentation result for training, (4) generating one or more losses by referring to the objectnesses for training and their corresponding GTs wherein each of the GTs includes information on locations of first exact rows where each of the bottom lines of the nearest obstacles for training is truly positioned per each of the columns, and on locations of second exact rows where each of the top lines of the nearest obstacles for training is truly positioned per each of the columns, and (5) backpropagating the losses, to thereby learn the parameters of the CNNs; and a processor for performing processes of (I) (i) instructing the convolutional layers of the first CNN to sequentially generate one or more first encoded feature maps for testing from the test image, and instructing the deconvolutional layers of the first CNN to sequentially generate one or more first decoded feature maps for testing from the first encoded feature maps for testing, and (ii) instructing the convolutional layers of the second CNN to sequentially generate one or more second encoded feature maps for testing from the test image, and instructing the deconvolutional layers of the second CNN to sequentially generate one or more second decoded feature maps for testing from the second encoded feature maps for testing, (II) assuming that each cell of a grid with a plurality of rows and a plurality of columns is generated by dividing the first and the second decoded feature maps for testing, with respect to a first direction and a second direction, wherein the first direction is in a direction of the rows of the first and the second decoded feature maps for testing and the second direction is it a direction of the columns thereof, (i) generating at least one first obstacle segmentation result for testing representing each of first specific rows for testing, where each of the bottom lines of each of the nearest obstacles for testing is estimated as being located per each of the columns, by referring to at least one feature for testing of at least one specific first decoded feature map for testing among the first decoded feature maps for testing, and (ii) generating at least one second obstacle segmentation result for testing representing each of second specific rows for testing, where each of the top lines of each of the nearest obstacles for testing is estimated as being located per each of the columns, by referring to at least one feature for testing of at least one specific second decoded feature map for testing among the second decoded feature maps for testing, and (III) estimating the objectnesses for testing corresponding to the nearest obstacles for testing on a road by referring to the first obstacle segmentation result for testing and the second obstacle segmentation result for testing.

23. The testing device of claim 22, wherein, at the process of (III), the processor further estimates one or more boundaries for testing of the road by referring to the first obstacle segmentation result for testing and the second obstacle segmentation result for testing, and
wherein, at the process of (4), the learning device has generated the losses by referring to one or more boundaries for training, the objectnesses for training, and their corresponding GTs.

24. The testing device of claim 23, wherein at the process of (III), if each difference of each distance between (i) each of the first specific rows for testing where each of the bottom lines of each of the obstacles for testing is estimated as located per each of the columns and (ii) each of the second specific rows for testing where each of the top lines of each of the obstacles for testing is estimated as located per each of the columns is detected as less than a predetermined threshold by referring to the first obstacle segmentation result for testing and the second obstacle segmentation result for testing, the processor determines that the boundaries for testing are present in the test image, and
wherein, if each difference of each distance between (i) each of the first specific rows for testing per each of the columns and (ii) each of the second specific rows for testing per each the columns is detected as larger than the predetermined threshold, the processor determines that the objectnesses for testing corresponding to the nearest obstacles for testing are present on the road in the test image.

25. The testing device of claim 22, wherein the process of (II) includes processes of:
(II-1) supposing that each cell of the grid is generated by dividing the first and the second decoded feature maps for testing with respect to the first direction by first intervals and with respect to the second direction by second intervals, concatenating each of features for testing of each of the rows per each of the columns in a direction of a channel, to thereby generate at least one first reshaped feature map for testing and at least one second reshaped feature map for testing; and
(II-2) (i) generating the first obstacle segmentation result for testing by checking each of estimated positions of each of the bottom lines of each of the obstacles for testing on concatenated channels for each of the columns on the first reshaped feature map for testing, wherein the first obstacle segmentation result for testing is generated by a first softmax operation which normalizes each value corresponding to each channel per each of the columns, and (ii) generating the second obstacle segmentation result for testing by checking each of estimated positions of each of the top lines of each of the obstacles for testing starting upward from each of the bottom lines on concatenated channels for each of the columns on the second reshaped feature map for testing, wherein the second obstacle segmentation result for testing is generated by a second softmax operation which normalizes each value corresponding to each channel per each of the columns.

26. The testing device of claim 22, wherein each of the columns includes one or more pixels in the first direction, and each of the rows includes one or more pixels in the second direction.

27. The testing device of claim 22, wherein the GTs include information representing on which row each of the bottom lines and each of the top lines of each of the nearest obstacles for training are truly located among the rows, per each of the columns, resulting from dividing the input image into $N_c$ rows, and
wherein the first obstacle segmentation result for testing and the second obstacle segmentation result for testing include information representing on which row each of the bottom lines and each of the top lines of each of the obstacles for testing are estimated as located among the rows, per each of the columns, resulting from dividing the test image into $N_c$ rows.

28. The testing device of claim 22, wherein, at the process of (II), a third obstacle segmentation result for testing is generated such that the third obstacle segmentation result for testing includes information on the first and the second specific rows for testing with top two highest values for each of the columns of concatenated features for testing, wherein the concatenated features for testing are generated by using features for testing of the first and the second decoded feature maps for testing, and wherein the third obstacle segmentation result for testing is generated by a third softmax operation which normalizes each value corresponding to each of the rows per each of the columns of the concatenated features for testing.

* * * * *